US007709055B2

(12) United States Patent
Ober et al.

(10) Patent No.: US 7,709,055 B2
(45) Date of Patent: May 4, 2010

(54) POLYMERS WITH ETHER CONTAINING SIDE CHAINS AND COMPOSITIONS THEREOF

(75) Inventors: Christopher K. Ober, Ithaca, NY (US); Sitaraman Krishnan, Ithaca, NY (US); Qin Lin, Ithaca, NY (US)

(73) Assignee: Cornell Research Foundation, Inc., Ithaca, NY (US)

( * ) Notice: Subject to any disclaimer, the term of this patent is extended or adjusted under 35 U.S.C. 154(b) by 1271 days.

(21) Appl. No.: 11/063,242

(22) Filed: Feb. 22, 2005

(65) Prior Publication Data

US 2006/0083854 A1 Apr. 20, 2006

Related U.S. Application Data

(60) Provisional application No. 60/546,656, filed on Feb. 20, 2004.

(51) Int. Cl.
*B05D 3/12* (2006.01)
(52) U.S. Cl. .................... 427/240; 427/421.1; 427/429; 427/430; 524/81
(58) Field of Classification Search ................ 427/240, 427/421.1, 429, 430.1; 524/81
See application file for complete search history.

(56) References Cited

U.S. PATENT DOCUMENTS

| | | | | | |
|---|---|---|---|---|---|
| 4,011,178 | A | * | 3/1977 | Muse .......................... | 524/356 |
| 4,480,075 | A | * | 10/1984 | Willis ......................... | 525/247 |
| 4,659,785 | A | * | 4/1987 | Nagano et al. .............. | 525/324 |
| 5,336,717 | A | | 8/1994 | Rolando et al. | |
| 5,907,017 | A | | 5/1999 | Ober et al. | |
| 6,114,467 | A | | 9/2000 | Ober et al. | |
| 6,583,228 | B2 | * | 6/2003 | Nkansah et al. ............. | 525/242 |
| 6,750,296 | B2 | * | 6/2004 | Ober et al. .................. | 525/200 |
| 2007/0053867 | A1 | | 3/2007 | Ober et al. | |
| 2007/0106040 | A1 | | 5/2007 | Ober et al. | |

FOREIGN PATENT DOCUMENTS

JP 2002-105152 4/2002

OTHER PUBLICATIONS

"Barnacle Free Boats", (Observed Feb. 28, 2005),3 pgs.
"DuPont tm Zonyl (r) FSO—Fluorosurfactant", *Dupont Technical Information Sheet* (P-200125.8), (2002),2 pgs.
"DuPont tm Zonyl (r) FSN—Fluorosurfactant", *DuPont Technical Information Sheet* (P-200125.8) (2002),2 pgs.
"DuPont tm Zonyl (r) FSN-100—Fluorosurfactant", *DuPont Technical Information Sheet* (P-200125.8), (2002),2 pgs.
"DuPont tm Zonyl (r) FSO-100—Fluorosurfactant", *DuPont Technical Information Sheet* (P-200125.8), (2002),2 pgs.
Baier, R. E., "Influence of the Initial Surface Condition of Materials on Bioadhesion", (Published Prior to Sep. 22, 2005),633-639.

Callow, M. E., et al., "Microtopographic Cues for Settlement of Zoospores of the Green Fouling Alga Enteromorpha", *Biofouling*, 18(3), (2002),237-245.
Callow, M. E., et al., "Primary Adhesion of *Enteromorpha* (Chlorophyta, Ulvales) Progagules: Quantitatve Settlement Studies and Video Microscopy", *J. Phycol.*, 33, (1997),938-947.
Callow, M. E., et al., "The Influence of Low Surface Energy Materials on Bioadhesion—a Review", *International Biodeterioration & Biodegradation*, (1994),333-348.
Callow, M. E., et al., "Use of Self-Assembled Monolayers of Different Wettabilities to Study Surface Selection and Primary Adhesion Processes of Green Algal (*Enteromorpha*) Zoospores", *Applied and Environmental Microbiology*, 66(8), (2000),3249-3254.
Fields, S. , et al., "New Paint: No Harm, No Foul?", *Environmental Health Perspectives*, 111(9), (2003),A457.
Finlay, J. A., et al., "Adhesion Strength of Settled Spores of the Green Alga *Enteromorpha*", *Biofouling*, 18(4), (2002),251-256.
Finlay, J. A., et al., "The Influence of Surface Wettability on the Adhesion Strength of Settled Spores of the Green Alga *Enteromorpha* and the Diatom Amphora", *Integr. Comp. Biol.*, 42, (2002),1116-1122.
Mao, G. , et al., "Molecular Design, Synthesis, and Characterization of Liquid Crystal-Coil Diblock Copolymers with Azobenzene Side Groups", *Macromolecules*, 30 (1997),2556-2567.
Ober, C. K., "Non-Leaching, Benign, Fouling Control, Multilayer Polymer Coatings for Marine Applications: PP-1274 Findings", Report submitted to The Strategic Enviironmental Research and Development Program (SERDP),(2003),21 pgs.
Ober, C. K., et al., "Surface-Active Materials With Antifouling Properties", *Polymer Preprints*, 45(1), (2004),2 pgs.
Ober, C. K., et al., "Surface-Active Materials With Antifouling Properties", *ACS 2004 Presentation*, (2004),29 pgs.
Ostuni, E. , et al., "Self-Assembled Monolayers That Resist the Adsorption of Proteins and the Adhesion of Bacterial and Mammalian Cells", *Langmuir*, 17, (2001),6336-6343.
Sigal, G. B., et al., "Effect of Surface Wettability on the Adsorption of Proteins and Detergents", *J. Am. Chem. Soc.*, 120, (1998),3464-3473.
Swain, G. W., et al., "The Influence of Biofouling: Adhesion and Biotic Distrubance on the Development of Fouling Communities on Non-Toxic Surfaces", *Biofouling*, 12(1-3), (1998),257-269.
Vreeland, V. , et al., "Polyphenols and Oxidases in Substratum Adhesion by Marine Algae and Mussels", *J. Phycol.*, 34, (1998),1-8.
Wang, Jianguo , "Liquid Crystalline, Semifluorinated Side Group Block Copolymers with Stable Low Energy Surfaces: Synthesis, Liquid Crystalline Structure, and Critical Surface Tension", *Macromolecules*, vol. 30, No. 7, (Apr. 1997),1906-1914.
Wynne, K. J., et al., "Two Silicone Nontoxic Fouling Release Coatings: Hydrosilation Cured PDMS and CaCO3 Filled, Ethoxysiloxane Cured RTV11", *Biofouling*, 16(2-4), (2000),277-288.

(Continued)

*Primary Examiner*—Jafar Parsa
*Assistant Examiner*—Chukwuma O Nwaonicha
(74) *Attorney, Agent, or Firm*—Schwegman, Lundberg & Woessner P.A.; Michael Haukaas

(57) ABSTRACT

The present invention provides compounds of formulae (I), (II), and (III), which can be block copolymers with various substituents and side-chain groups. The side-chains can include semifluorinated alkyl- and PEG-derived groups. The block copolymers can be surface active block copolymers (SABCs) and can be used as antifouling coatings. Coating compositions employing the compounds of the invention and methods for their use are also provided.

21 Claims, 5 Drawing Sheets

OTHER PUBLICATIONS

Xiang, Maoliang, "Surface Stability in Liquid-Crystalline Block Copolymers with Semifluorinated Monodendron Side Groups", *Macromolecules*, vol. 33, No. 16, (Aug. 2000),6106-6119.

Youngblood, J. P., et al., "Coatings Based on Side-Chain Ether-Linked Poly(ethylene glycol) and Fluorocarbon Polymers for the Control of Marine Biofouling", *Biofouling*, 19 (Supplement), (2003),91-98.

Davis, K. A., "ABC Triblock Copolymers Prepared Using Atom Transfer Radical Polymerization Techniques", *Macromolecules*, 34(7), (2001), 2101-2107.

Freij-Larsson, C., et al., "Adsorption Behaviour of Amphiphilic Polymers at Hydrophobic Surfaces: Effects on Protein Adsorption", *Biomaterials*, 17(22), (Nov. 1996), 2199-2207.

Gudipati, C. S., et al., "The Antifouling and Fouling-Release Performance of Hyperbranched Fluoropolymer (HBPF)-Poly(ethylene glycol) (PEG) Composite Coatings Evaluated by Adsorption of Biomacromolecules and the Green Fouling Alga *ULVA*", *Langmuir*, 21(7), (2005), 3044-3053.

Hexemer, A., et al., "Managing Polymer Surface Structure Using Surface Active Block Copolymers in Block Copolymer Mixtures", *Journal of Polymer Science Part B: Polymer Physics*, 42(3), (2003), 411-420.

Hourdet, D., et al., "Synthesis of Thermoassociative Copolymers", *Polymer*, 38(10), (May 1997), 2535-2547.

Hussain, H., et al., "Amphiphilic Block Copolymers of Poly(ethylene oxide) and Poly(perfluorohexylethyl methacrylate) at the Water Surface and Their Penetration into the Lipid Monolayer", *J. Phys. Chem. B.*, 108(28), (2004), 9962-9969.

Keszler, B., et al., "Amphiphilic Networks—V. Polar/Nonpolar Surface Characteristics, Protein Adsorption From Human Plasma and Cell Adhesion", *Polymer Bulletin*, 29, (1992), 681-688.

Li, J., et al., "Synthesis of Polyethylene Glycol (PEG) Derivatives and PEGylated-Peptide Biopolymers Conjugates", *Biomacromolecules*, 4(4), (2003), 1055-1067.

Masson, P., et al., "Thermotropic Liquid Crystalline Behaviour of Pyridinium and Poly(4-vinylpyridinium) Salts Quaternized With ω-alkyl Phenylbenzoate Derivatives", *Macromolecular Chemistry and Physics*, 200(3), (1999), 616-620.

Park, D., at al., "Amphiphilic Networks. 9. Surface Characterization", *Macromolecules*, 28(8), (1995), 2595-2601.

Poe, G. D., et al., "Enhanced Coil Expansion and Intrapolymer Complex Formation of Linear Poly(methacrylic acid) Containing Poly(ethylene glycol) Grafts", *Macromolecules*, 37(7), (2004), 2603-2612.

Wang, J., et al., "Self-Organizing Materials With Low Surface Energy: The Synthesis and Solid-State Properties of Semifluorinated Side-Chain Ionenes", *Macromolecules*, 30(24), (1997), 7560-7567.

"U.S. Appl. No. 11/507,355, Non-Final Office Action mailed Aug. 4, 2009", 14 Pgs.

"U.S. Appl. No. 11/507,361, Non-Final Office Action mailed Jul. 30, 2009", 11 Pgs.

Cormack, P., et al., "Molecular imprinting: recent developments and the road ahead", *Reactive and Functional Polymers*, 41(1-3), (Jul. 15, 1999), 115-124.

Ober, et al., "Block copolymers as surface modifiers: Synthesis, characterization and relevance to fouling release and biostability", *PMSE Preprints*, 88, (2003), 612-613.

Zhu, J., et al., "Interfacial behavior of block polyelectrolytes. 6. Properties of surface micelles as a function of R and X in P(S260-b-VP240/RX)", *Macromolecules*, 25(24), (1992), 6656-62.

Krishnan, S., et al., "Anti-Biofouling Properties of Comblike Block Copolymers With Amphiphilic Side Chains", *Langmuir*, 22, (2006), 5075-5086.

Krishnan, S., et al., "Antibacterial Coatings Based on Quaternized Poly(4-vinylpyridine) Block Copolymers", *PMSE Preprints*, 91, (2004), 814-815.

Krishnan, S., et al., "Comparison of the Fouling Release Properties of Hydrophobic Fluorinated and Hydrophilic PEGylated Block Copolymer Surfaces: Attachment Strength of the Diatom *Navicula* and the Green Alga *Ulva*", *Biomacromolecules*, 7, (2006), 1449-1462.

Lee, S. B., et al., "Permanent, Nonleaching Antibacterial Surfaces. 1. Synthesis by Atom Transfer Radical Polymerization", *Biomacromolecules*, 5, (2004), 877-882.

Tiller, J. C., et al., "Designing Surfaces That Kill Bacteria on Contact", *Proc. Natl. Acad. Sci. USA*, 98(11), (May 22, 2001), 5981-5985.

* cited by examiner

POLYMERS WITH ETHER CONTAINING SIDE CHAINS AND COMPOSITIONS THEREOF

RELATED APPLICATIONS

This application claims priority under 35 U.S.C. §119 from U.S. Provisional Application No. 60/546,656; filed on Feb. 20, 2004, which is incorporated herein by reference.

GOVERNMENT FUNDING

The invention described herein was made at least in part with government support under Grant Numbers N00014-99-1-0311, N00014-00-1-0154, N00014-02-1-0521, N00014-02-1-0170 and N00014-04-1-0257, awarded by the Office of Naval Research, and Contract Numbers PP-1274 and PP-1454, awarded by the SERDP program. The United States Government has certain rights in the invention.

BACKGROUND OF THE INVENTION

Marine fouling is a major problem in the transport of materials worldwide as it raises fuel consumption by as much as 30%. Environmentally friendly coatings that protect the hulls of ships below the waterline against fouling by seaweed, barnacles, and other organisms are currently sought by the shipping industry. Fouling by these organisms produces additional drag on the ship, increasing the operating and maintenance costs. Currently, antifouling paints containing tin and copper biocides are used because of their effectiveness against most forms of fouling. However, these biocidal organometallic compounds that are environmentally persistent cause damage to the ecosystem, and enter the food chain. The ban on tributyltin (TBT) antifoulants by the International Maritime Organization will be effective in 2008, and copper-based coatings are expected to face similar restrictions in the near future.

Non-toxic "fouling-release" or "fouling-repellant" coatings are desirable alternatives to coatings that are biocidal. Silicone-based paints that belong to the former category are commercially available, but do satisfy many of the desired performance characteristics. The soft silicones do not withstand the rigorous demands of the marine environment, do not sufficiently and consistently self-clean, or, due to polymer restructuring or other degradation pathways, lose many of the desirable surface properties with time and exposure to marine organisms.

Current understanding of antifouling materials is that the most effective copper-free fouling control systems are low surface energy coatings, namely silicone or fluoropolymer based coatings that minimize the adhesion strength between fouling organisms and surface. For extended performance life, these coating systems must have controlled and stable surface energy and composition, have elastomeric properties, and adhere well to the substrate. To date, several fouling release (FR) coating systems are commercially available, mostly based on silicone polymers, yet none meet all of the desired performance characteristics. Many commercially available coating systems lack the toughness required to withstand the rigorous physical demands of the marine environment, do not sufficiently and consistently self-clean, and due to polymer restructuring or other degradation pathways, lose many of the desirable surface properties with time and exposure to the marine environment.

It is now apparent that adhesion strength of hard fouling organisms is proportional to $(\gamma E)^{1/2}$, where $\gamma$ is the surface energy and E is the modulus of the surface. For this reason, silicone elastomers are, as of now, the only commercial environmentally benign fouling release coatings, because they possess both low modulus and low surface energy. The efficacy of silicone polymers is lower than that of biocide-containing antifouling paints, and regular mechanical cleaning (scrubbing) of the coated surface is required, adding to the operating expense. It would be advantageous to use fluorinated materials to lower the surface energy of a coating and decrease the adhesion strength, but these materials are typically hard and brittle with high moduli and do not provide good control of biofouling. Thermoplastic elastomers such as styrene-ethylene/butylene-styrene (SEBS) block copolymers offer good mechanical properties (low E), but not the desired surface energy.

Poly(ethylene glycol) (PEG) is commonly known by the biomaterials community to have good fouling resistance. The polymer has many useful properties such as low protein adsorption, good stability, low toxicity, and is, in general, compatible with biological processes as well as the human body. For fouling-release applications, such materials are lacking in several critical properties such as mechanical behavior, long-term stability, and ease of application, which limits their use as coating materials. As with biomedical surfaces used in the body, the first event in biofouling in the marine environment is adsorption of a conditioning film that includes proteins and glycoproteins.

What is needed is a material that lowers the strength of adhesion between the fouling organisms and the surface such that an environmentally friendly coating is provided that not only decreases the accumulation of the organisms, but also aids their removal. The diversity of fouling organisms and environmental conditions worldwide makes the task of developing a coating that resists fouling and/or self-cleans challenging, and novel non-toxic solutions are urgently needed.

SUMMARY OF THE INVENTION

The present invention provides modified polystyrene-based surface-active block copolymers (SABC), methods for their preparation, methods of using such copolymers, and articles of manufacture that include such copolymers. The invention includes both diblock and triblock polymers. The modifications include both backbone and side-chain modifications. The modifications can result in various substitutions on the mers of the backbone polymer. The mers can be substituted with side groups, such as, for example, semifluorinated (SF), poly(ethylene glycol) (PEG), or ethoxylated fluoroalkyl side groups, or a combination thereof.

The surface-active side groups modify the coating-water interfacial energy, conferring fouling-release and/or fouling-repellant properties to the surface. Fouling-release also depends on the elastic modulus of the surface, which can be controlled by blending the surface-active block copolymers (SABC) with a thermoplastic elastomer (TPE). The TPE can be a commercially available thermoplastic elastomer, such as the Kraton® styrene-ethylene/butylene-styrene (SEBS) triblock polymer. The resulting coatings can be either a single layer obtained from a blend of the TPE and SABC, or a bi-layer with an elastomeric base (TPE) and an upper surface-active layer (SABC). Specifically, the surface active block copolymer (SABC) can be useful in the manufacture of an anti-fouling coating, a low energy surface material, or a combination thereof.

The compounds of the invention are useful in the manufacture of anti-fouling coatings and low energy surface materials. The surface active compounds undergo minimal or no surface reconstruction when immersed in a polar environment, they possess non-wetting and low friction properties, they resist biofouling by marine organisms, they exhibit minimal protein adsorption, they resist heterogeneous nucleation of ice, and are non-toxic and typically are biocompatible. The compounds of the invention can be used as antifouling substitutes to copper-containing paints, such as for the protection of boat hulls.

The ether-linked side-chain compounds of the invention can withstand the rigorous demands of a marine environment, as opposed to ester-linked side-chain compounds, whose side-chains degrade over time by hydrolysis. The ether-linked compounds also can self-clean under typical marine conditions, and do not lose many of the desirable surface properties with time and exposure to marine organisms due to polymer restructuring or other degradation pathways. The ether-linked side-chain compounds of the invention can minimize the adhesion strength between fouling organisms and surface. Additionally, these compounds also have elastomeric properties, and adhere well to substrates.

Accordingly, the present invention provides a compound of formula (I):

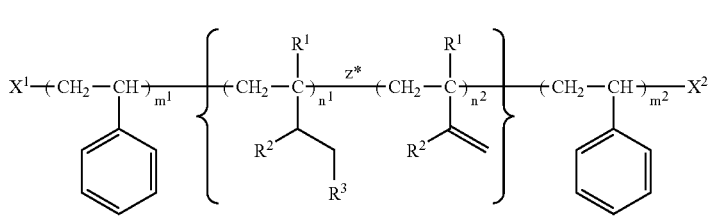
(I)

wherein $m^1$ is about 5 to about 2000;
$m^2$ is absent or is about 5 to about 2000;
$n^1$ is about 5 to about 2,000;
$n^2$ is 0 to about 100;
the dispersement of each individual $n^1$ subunit and each individual $n^2$ subunit on either side of $z^*$ is random and each individual $n^1$ subunit and each individual $n^2$ subunit occurs interchangeably with any other $n^1$ or $n^2$ subunit within the brackets of formula (I);
$X^1$ is hydrogen, optionally substituted alkyl, or optionally substituted aryl;
$X^2$ is hydrogen, optionally substituted alkyl, or optionally substituted aryl;
wherein any alkyl or aryl can optionally be substituted with one or more halo, hydroxy, $(C_6-C_{10})$aryl, nitro, cyano, $(C_1-C_8)$alkoxy, trifluoromethyl, poly(ethylene glycol), oxo, —C(=O)OR$^a$, —OC(=O)R$^a$, wherein each R$^a$ is independently hydrogen, $(C_1-C_6)$alkyl, or $(C_1-C_6)$alkoxy; or NR$^b$R$^c$, wherein R$^b$ and R$^c$ are each independently hydrogen, or $(C_1-C_6)$alkyl;
each $R^1$ is independently hydrogen or methyl and each $R^2$ is independently hydrogen or methyl provided that at least one of $R^1$ and $R^2$ within each $n^1$ or $n^2$ subunit is hydrogen;
each $R^3$ is independently H, OH, halo, or

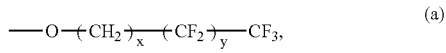
(a)

wherein x is independently 2 to 10; and
y is independently 5 to 15;

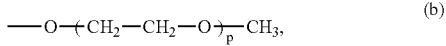
(b)

wherein p is independently 2 to 24; or

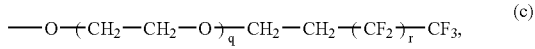
(c)

wherein q is independently 0 to about 25; and
r is independently 1 to about 18.

In formula (I), $m^1$ can also be about 25 to about 1000. Specifically, $m^1$ can be about 50 to about 250. More specifically, $m^1$ can be about 65 to about 150. The subunit $m^2$ can be absent. Alternatively, $m^2$ can be about 25 to about 1000. Specifically, $m^2$ can be about 50 to about 250. More specifically, $m^2$ can be about 65 to about 150.

The values for $m^1$ and $m^2$ can be each independently about 65 to about 200. The values of $m^1$ and $m^2$ can be within about 20% of each other. Specifically, the values of $m^1$ and $m^2$ are within about 10% of each other. More specifically, the values of $m^1$ and $m^2$ are within about 5% of each other. The values of $m^1$ and $m^2$ can be each about 65 and $n^1$ can be about 600, about 400, about 200, or about 100.

The value of $n^1$ can be about 100 to about 2,000. Specifically, $n^1$ can be about 500 to about 1600. More specifically, $n^1$ can be about 600 to about 1200.

The value of $m^1$ can be about 65 and the value of $n^1$ can be about 600. The value of $m^1$ can also be about 100 and the value of $n^1$ can also be about 950. Alternatively, the value of $m^1$ can be about 135 and the value of $n^1$ can be about 1300.

The average-number molecular weight of a polystyrene block can be about 20,000 g/mol to about 30,000 g/mol. Specifically, the average-number molecular weight of a polystyrene block can be about 25,000 g/mol. The average-number molecular weight of the polyisoprene or polybutadiene block can be about 10,000 g/mol to about 20,000 g/mol. Specifically, the average-number molecular weight of the polyisoprene or polybutadiene block can be about 15,000 g/mol.

The 1,2- and/or 3,4-polyisoprene-derived subunits can be present in greater than about 90% of the subunits of the polyisoprene-derived block. Specifically, 1,2- and/or 3,4-polyisoprene-derived subunits can be present in greater than about 95% of the subunits of the polyisoprene-derived block. More specifically, 1,2- and/or 3,4-polyisoprene-derived subunits can be present in greater than about 97% of the subunits of the polyisoprene-derived block. The remainder of the polyisoprene-derived subunits can consist of 1,4-derived polyisoprene subunits.

The variable $X^1$ can be $(C_1-C_6)$alkyl and $X^2$ can be hydrogen. The variable $X^1$ can be $(C_1-C_6)$cycloalkyl and $X^2$ can be hydrogen. The variable $X^1$ can be $(C_6-C_{10})$aryl and $X^2$ can be hydrogen. Specifically, $X^1$ can be sec-butyl and $X^2$ can be hydrogen.

In formula (I), about 10-40% of all $R^1$ groups can be methyl and about 60-90% of all $R^2$ groups can be hydrogen, and about 60-90% of the all $R^1$ groups can be hydrogen and about 10-40% of all $R^2$ groups can be methyl. Specifically, about 25-35% of all $R^1$ groups can be methyl and about 65-75% of all $R^2$ groups can be hydrogen, and about 65-75% of the all $R^1$ groups can be hydrogen and about 25-35% of all $R^2$ groups can be methyl. More specifically, about 30% of all $R^1$ groups can be methyl and about 70% of all $R^2$ groups can be hydrogen, and about 70% of the all $R^1$ groups can be hydrogen and about 30% of all $R^2$ groups can be methyl.

Alternatively, each $R^1$ and $R^2$ can be hydrogen.

Each $R^3$ can be $$-O-(CH_2)_x-(CF_2)_y-CF_3.$$

Each $R^3$ can also be $$-O-(CH_2-CH_2-O)_p-CH_3.$$

Each $R^3$ can also be $$-O-(CH_2-CH_2-O)_q-CH_2-CH_2-(CF_2)_r-CF_3.$$

Alternatively, each $R^3$ can independently be $$-O-(CH_2)_x-(CF_2)_y-CF_3,$$

$$-O-(CH_2-CH_2-O)_p-CH_3, \text{ or}$$

$$-O-(CH_2-CH_2-O)_q-CH_2-CH_2-(CF_2)_r-CF_3.$$

Compounds of formula (I) can be prepared wherein about 5-50% of all $R^3$ groups can be OH or Br. Specifically, about 10-40% of all $R^3$ groups can be OH or Br. More specifically, about 20-35% of all $R^3$ groups can be OH or Br. Additionally, about 5-70% of all $R^3$ groups can be H, OH, or halo. The $R^3$ groups can also be various combinations of H, F, Cl, Br, I, and OH. Specifically, about 10-60%, about 20-40%, or about 30% of $R^3$ groups can also be combinations of H, F, Cl, Br, I, and OH.

The value of each x can also be about 3 to 9. Specifically, each x can be about 4 to 6.

The value of each y can also be about 6 to 11. Specifically, each y can be about 7 to 9.

The value of each p can also be about 2 to 16. Specifically, each p can be about 3 to 14. More specifically, each p can be about 8 to 12.

The value of each q can be 0. The value of each q can also be 1 to about 25. Specifically, each q can be 1 to about 15.

The value of each r can be 1 to about 18. Specifically, each r can be 1 to about 14. More specifically, each r can be about 2 to about 12.

The invention also provides a compound of formula (II):

$m^2$ is absent or is independently about 5 to about 2000;
$n^1$ is about 5 to about 2,000;
$n^2$ is 0 to about 100;
$n^3$ is 0 to about 100;
the dispersement of each individual $n^1$, $n^2$, and $n^3$ subunit on either side of either z* is random and each individual $n^1$, $n^2$, and $n^3$ subunit occurs interchangeably with any other $n^1$, $n^2$, or $n^3$ subunit within the brackets of formula (II);
$X^1$ is hydrogen, alkyl, or aryl;
$X^2$ is hydrogen, alkyl, or aryl;
wherein any alkyl or aryl can optionally be substituted with one or more halo, hydroxy, $(C_6-C_{10})$aryl, nitro, cyano, $(C_1-C_8)$alkoxy, trifluoromethyl, poly(ethylene glycol), oxo, $-C(=O)OR^a$, $-OC(=O)R^a$, wherein each $R^a$ is independently hydrogen, $(C_1-C_6)$alkyl, or $(C_1-C_6)$alkoxy; or $NR^bR^c$, wherein $R^b$ and $R^c$ are each independently hydrogen, or $(C_1-C_6)$alkyl;
each $R^1$ is independently hydrogen or methyl and each $R^2$ is independently hydrogen or methyl provided that at least one of $R^1$ and $R^2$ within each n subunit is hydrogen;
each $R^3$ is independently H, OH, halo, or $$-O-(CH_2)_x-(CF_2)_y-CF_3, \quad (a)$$

wherein x is independently 2 to 10; and
y is independently 5 to 15;

$$-O-(CH_2-CH_2-O)_p-CH_3, \quad (b)$$

wherein p is independently 2 to 24; or $$-O-(CH_2-CH_2-O)_q-CH_2-CH_2-(CF_2)_r-CF_3, \quad (c)$$

wherein q is independently 0 to about 25; and
r is independently 1 to about 18;
each $R^4$ and $R^5$ are independently hydrogen, $R^3$, or are absent, provided that when $R^4$ is hydrogen, $R^5$ is $R^3$; and when $R^4$ is $R^3$, $R^5$ is hydrogen; and
the bond represented by - - - is absent or is present, provided that when the bond is present, $R^4$ and $R^5$ are absent.

Each of the specific values and ranges presented for compounds of formula (I) above also apply to compounds of formula (II).

$$X^1-(CH_2-CH)_{m^1}\left\{(CH_2-\underset{R^2}{\underset{|}{\overset{R^1}{\underset{|}{C}}}}-\underset{R^3}{\underset{|}{CH_2}})_{n^1}\overset{z^*}{-}(CH_2-\underset{R^2}{\underset{|}{\overset{R^1}{\underset{|}{C}}}})_{n^2}\overset{z^*}{-}\left(CH_2-\underset{R^4}{\underset{|}{\overset{R^1}{\underset{|}{C}}}}\overset{R^2}{\underset{R^5}{\overset{|}{=\!=\!=}\underset{|}{C}}}-CH_2\right)_{n^3}\right\}(CH_2-CH)_{m^2}-X^2 \quad (II)$$

wherein $m^1$ is about 5 to about 2000;

The invention also provides a compound of formula (III):

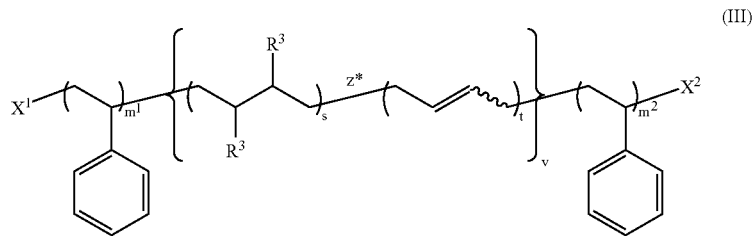

(III)

wherein $m^1$ is about 5 to about 2000;
$m^2$ is absent or is independently about 5 to about 2000;
each s is independently about 1 to about 500;
each t is independently about 1 to about 500;
v is 1 to about 500;
the dispersement of each individual s subunit and each individual t subunit on either side of z* is random and each individual s subunit and each individual t subunit occurs interchangeably with any other s or t subunit within the brackets of formula (III);
$X^1$ is hydrogen, alkyl, or aryl;
$X^2$ is hydrogen, alkyl, or aryl;
wherein any alkyl or aryl can optionally be substituted with one or more halo, hydroxy, $(C_6\text{-}C_{10})$aryl, nitro, cyano, $(C_1\text{-}C_8)$alkoxy, trifluoromethyl, poly(ethylene glycol), oxo, —C(=O)OR$^a$, —OC(=O)R$^a$, wherein each R$^a$ is independently hydrogen, $(C_1\text{-}C_6)$alkyl, or $(C_1\text{-}C_6)$alkoxy; or NR$^b$R$^c$, wherein R$^b$ and R$^c$ are each independently hydrogen, or $(C_1\text{-}C_6)$alkyl;
each $R^3$ is independently H, OH, halo, or

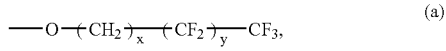

(a)

wherein x is independently 2 to 10; and
y is independently 5 to 15;

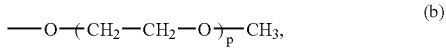

(b)

wherein p is independently 2 to 24; or

(c)

wherein q is independently 0 to about 25; and
r is independently 1 to about 18, provided that when one $R^3$ of any given subunit s is (a), (b), or (c), the other $R^3$ of the same subunit s is not (a), (b), or (c).

Each of the specific values and ranges presented for compounds of formula (I) above also apply to compounds of formula (III), to the extent those variables are found in formula (III).

In compounds of formula (III), the variable s can also be about 10 to about 500. Specifically, s can be about 50 to about 400, or about 65 to about 200, or about 150. The variable t can also be about 10 to about 400. Specifically, the variable t can be about 5 to about 250, about 10 to about 150, about 15 to about 100, about 20 to about 75, or about 25 to about 50. The variable v can be 1. The variable v can also be about 2 to about 50, or about 5 to about 20. When the values of s and t are greater than about 100, the value of v is typically less than about 10.

The invention also provides for a coating composition that includes a compound of formula (I), (II), or (III), in combination with other ingredients. Such other ingredients can include, for example, a polymer, water, one or more solvents, additives, stabilizers, colorants, dispersants, or combinations thereof.

The invention also provides a method of at least partially coating a surface by contacting the surface with a composition containing a compound of formula (I), (II), or (III). The coating procedure can be performed by brushing, immersing, pouring, solvent-casting, spin-coating, or spray-coating to contact the surface with the composition. Accordingly, the invention provides a method of coating or protecting a substrate, for example, a boat hull, from biofouling.

The surface coated by the composition can be a layer of a thermoplastic polymer. The thermoplastic polymer can at least partially covers a boat hull, pontoon, or any other structure in need of such a coating. The average-weight molecular weight of the polystyrene block of the compound of formula (I), (II), or (III) in the composition used to coat the thermoplastic polymer can be within about 20%, or about 10%, or about 5% of the average-weight molecular weight of the polystyrene block or blocks of a polymer comprising the thermoplastic polymer.

A bilayer can be formed and the bilayer can be annealed at a temperature above the glass transition temperature of the polystyrene blocks of the polymers in the bilayer. The coating can result in a top layer of about 30 nm to about 300 nm in thickness. Specifically, the coating can result in a top layer of about 40 nm to about 150 nm in thickness. More specifically, the coating can result in a top layer of about 50 nm to about 75 nm in thickness.

BRIEF DESCRIPTION OF THE DRAWINGS

FIG. 2 was provided by Dr. Maureen Callow at the University of Birmingham, School of Biosciences, UK.

DETAILED DESCRIPTION

Figure 1:
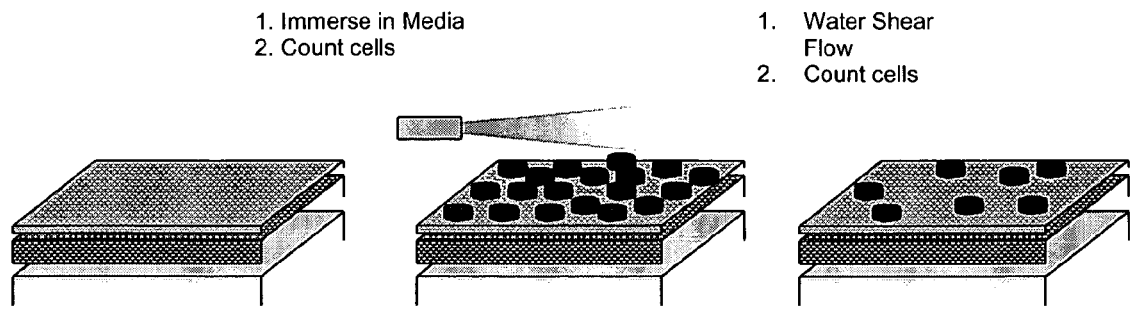
FIG. 1 illustrates a schematic of the algal zoospore attachment assay for determining the extent of zoospore settlement and removal in Example 1.
Figure 2:
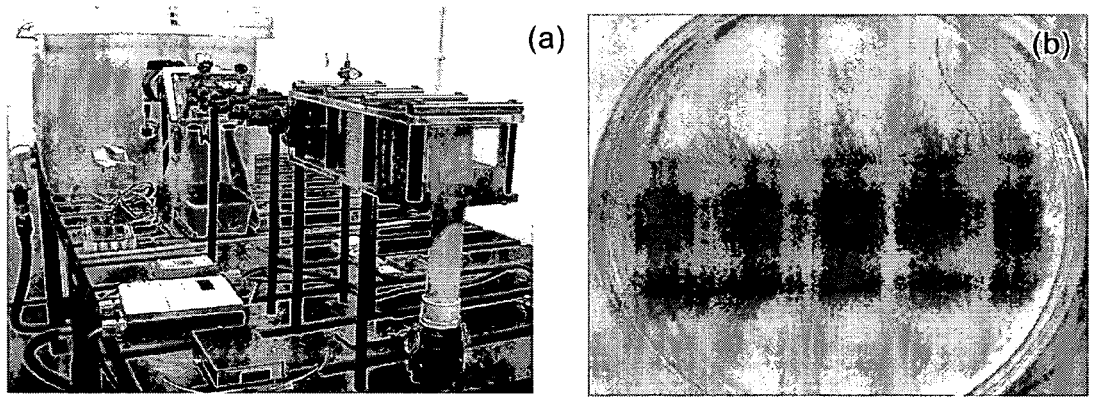
FIG. 2 illustrates (a) turbulent flow apparatus for biofouling removal assays; and (b) a microscope glass slide covered with sporelings in Example 1.

The following definitions are used, unless otherwise described: halo can be fluoro, chloro, bromo, or iodo. Alkyl, alkoxy, etc. denote both straight and branched groups; but reference to an individual radical such as "propyl" embraces only the straight chain radical, a branched chain isomer such as "isopropyl" being specifically referred to. Aryl denotes a phenyl radical or an ortho-fused bicyclic carbocyclic radical having, for example, about nine to ten ring atoms in which at least one ring is aromatic. Heteroaryl encompasses a radical attached via a ring carbon of a monocyclic aromatic ring containing five or six ring atoms consisting of carbon and one to four heteroatoms each selected from the group consisting of non-peroxide oxygen, sulfur, and N(X) wherein X is absent or is H, O, ($C_1$-$C_4$)alkyl, phenyl or benzyl, as well as a radical of an ortho-fused bicyclic heterocycle of about eight to ten ring atoms derived therefrom, particularly a benz-derivative or one derived by fusing a propylene, trimethylene, or tetramethylene diradical thereto.

Specific values listed below for radicals, substituents, and ranges, are for illustration only; they do not exclude other defined values or other values within defined ranges for the radicals and substituents It will be appreciated by those skilled in the art that compounds of the invention having a chiral center may exist in and be isolated in optically active and racemic forms. Some compounds may exhibit polymorphism. It is to be understood that the present invention encompasses any racemic, optically-active, polymorphic, or stereoisomeric form, or mixtures thereof, of a compound of the invention, which possess the useful properties described herein, it being well known in the art how to prepare optically active forms (for example, by synthesis from optically-active starting materials, by using resolution of the racemic form by recrystallization techniques, by chiral synthesis, or by chromatographic separation using a chiral stationary phase). Thus, the compounds of this invention include all stereochemical isomers arising from the various structural variations of these compounds.

As used herein, the term "alkyl" refers to a monoradical branched or unbranched saturated hydrocarbon chain having, for example, from 1 to 12 carbon atoms, and often 1 to 6 carbon atoms. Examples include, but are not limited to, methyl (Me, —$CH_3$), ethyl (Et, —$CH_2CH_3$), 1-propyl (n-Pr, n-propyl, —$CH_2CH_2CH_3$), 2-propyl (i-Pr, i-propyl, —CH($CH_3)_2$), 1-butyl (n-Bu, n-butyl, —$CH_2CH_2CH_2CH_3$), 2-methyl-1-propyl (i-Bu, i-butyl, —$CH_2CH(CH_3)_2$), 2-butyl (s-Bu, s-butyl, —CH($CH_3$)$CH_2CH_3$), 2-methyl-2-propyl (t-Bu, t-butyl, —C($CH_3)_3$), 1-pentyl (n-pentyl, —$CH_2CH_2CH_2CH_2CH_3$), 2-pentyl (—CH($CH_3$)$CH_2CH_2CH_3$), 3-pentyl (—CH($CH_2CH_3)_2$), 2-methyl-2-butyl (—C($CH_3)_2CH_2CH_3$), 3-methyl-2-butyl (—CH($CH_3$)CH($CH_3)_2$), 3-methyl-1-butyl (—$CH_2CH_2CH(CH_3)_2$), 2-methyl-1-butyl (—$CH_2CH(CH_3)CH_2CH_3$), 1-hexyl (—$CH_2CH_2CH_2CH_2CH_2CH_3$), 2-hexyl (—CH($CH_3$)$CH_2CH_2CH_2CH_3$), 3-hexyl (—CH($CH_2CH_3$)($CH_2CH_2CH_3$)), 2-methyl-2-pentyl (—C($CH_3)_2CH_2CH_2CH_3$), 3-methyl-2-pentyl (—CH($CH_3$)CH($CH_3$)$CH_2CH_3$), 4-methyl-2-pentyl (—CH($CH_3$)$CH_2CH(CH_3)_2$), 3-methyl-3-pentyl (—C($CH_3$)($CH_2CH_3)_2$), 2-methyl-3-pentyl (—CH($CH_2CH_3$)CH($CH_3)_2$), 2,3-dimethyl-2-butyl (—C($CH_3)_2CH(CH_3)_2$), 3,3-dimethyl-2-butyl (—CH($CH_3$)C($CH_3)_3$), 1-octyl, 1-decyl, and 1-dodecyl.

Alkoxy can be ($C_1$-$C_{12}$)alkoxy, such as, for example, methoxy, ethoxy, propoxy, isopropoxy, butoxy, iso-butoxy, sec-butoxy, pentoxy, 3-pentoxy, hexyloxy, or octyloxy. Any alkyl, cycloalkyl, or alkoxy can be optionally unsubstituted or substituted.

As used herein, "substituted" means one or more hydrogen of a particular group can be, or has been replaced by one or more substitutents, for example, one or more halo, hydroxy, ($C_6$-$C_{10}$)aryl, nitro, cyano, ($C_1$-$C_8$)alkoxy, trifluoromethyl, poly(ethylene glycol), oxo, —C(=O)O$R^a$, —OC(=O)$R^a$, wherein each $R^a$ is independently hydrogen, ($C_1$-$C_6$)alkyl, or ($C_1$-$C_6$)alkoxy; or N$R^b R^c$, wherein $R^b$ and $R^c$ are each independently hydrogen, or ($C_1$-$C_6$)alkyl.

As used herein, "aryl" refers to a monovalent aromatic hydrocarbon radical of 6-20 carbon atoms derived by the removal of one hydrogen atom from a single carbon atom of a parent aromatic ring system. Typical aryl groups include, but are not limited to, radicals derived from benzene, substituted benzene, naphthalene, anthracene, biphenyl, and the like. Aryl can also refer to an unsaturated aromatic carbocyclic group of from 6 to 12 carbon atoms having a single ring (e.g., phenyl) or multiple condensed (fused) rings, wherein at least one ring is aromatic (e.g., naphthyl, dihydrophenanthrenyl, fluorenyl, or anthryl). The aryl can be unsubstituted or substituted.

As used herein, the term "cycloalkyl" refers to cyclic alkyl groups of from 3 to 10 carbon atoms having a single cyclic ring or multiple condensed rings. Such cycloalkyl groups include, by way of example, single ring structures such as cyclopropyl, cyclobutyl, cyclopentyl, cyclooctyl, and the like, or multiple ring structures such as adamantanyl, and the like. The cycloalkyl can be unsubstituted or substituted.

As used herein, the term "mer" or "mers" refers to a unit of a polymer derived from a particular monomer. For example, a styrene mer refers to a segment of a polymer that was prepared from styrene to form polystyrene. Accordingly, a mer refers to a specific phenylethyl diradical within the polymerized chain.

As used herein, the term "semifluorinated" refers to an alkyl group that has at least one hydrogen atom replaced by a fluorine atom. Semifluorinated groups include any carbon chains, or carbon chains that are interrupted by one or more heteroatoms, that contain one or more fluorine atoms. Zonyl surfactants are considered semifluorinated groups.

Zonyl® surfactants refer to ethoxylated fluoroalkyl chains with terminal alcohol groups. Zonyl® surfactants can be obtained from Dupont (Wilmington, Del.). These surfactants can be attached to appropriately functionalized block copolymers via the hydroxyl group, or via a halo group which has replaced the hydroxyl group. Accordingly, block copolymers having ethoxylated fluoroalkyl side chains can be prepared using any appropriate Zonyl® surfactant. One example of a suitable Zonyl® surfactant that can be used to prepare ethoxylated fluoroalkyl side chain-containing block copolymers is Zonyl FSO-100 [CAS # 122525-99-9]. Other suitable Zonyl® surfactants include Zonyl FSN, Zonyl FSN-100, and Zonyl FSO.

As used herein, "contacting" refers to the act of touching, making contact, or of bringing within immediate proximity.

As used herein, "coating" refers to a manufacturing process or preparation for applying an adherent layer to a workpiece or substrate web. A coating can also be a layer of material that at least partially covers an underlying surface, such as a boat hull, pontoon, or any other surface in need of an antifouling coating.

Useful acronyms for describing the invention include the following:

| | |
|---|---|
| NEXAFS | near-edge X-ray absorption fine structure |
| PEG | poly(ethylene glycol) |
| PI | polyisoprene |
| PS | polystyrene |
| PS/PI | poly(styrene-block-isoprene) |
| PS/PI Br | poly(styrene-block-isoprene) with brominated isoprene block |
| PS/PI Br—F8H6 | PS/PI Br polymer modified using $F(CF_2)_8(CH_2)_6OH$ |

-continued

| | |
|---|---|
| PS/PI OH | poly(styrene-block-isoprene) with hydroxylated isoprene block |
| PS/PI OH-PEG164 | PS/PI OH polymer modified using 164 g/mol PEG |
| PS/PI OH-PEG550 | PS/PI OH polymer modified using 550 g/mol PEG |
| PTFE | poly(tetrafluoroethylene) |
| SABC | surface active block copolymer |
| SEBS | styrene-ethylene/butylene-styrene |
| SF | semifluorinated |
| $T_g$ | glass transition temperature |
| TBT | tributyltin |
| THF | tetrahydrofuran |
| TPE | thermoplastic elastomer. |

Specific Embodiments of the Invention

Specific values described for radicals, substituents, and ranges, as well as specific embodiments of the invention described herein, are for illustration only; they do not exclude other defined values or other values within defined ranges, as would be recognized by one skilled in the art.

Some specific embodiments of the invention include the following compounds (1)-(6), wherein any variables are as defined for compounds of formulae (I) or (II). One skilled in the art will understand that the structure represented by subunit $n^1$ may occasionally be a 1,4-isoprene-derived subunit, and as such, may contain an internal vinyl group. Additionally, any suitable and effective initiator can be employed, giving rise to other groups in place of sec-butyl. Likewise, quenching agents other than methanol may be employed, giving rise to terminal groups other than hydrogen.

(1)

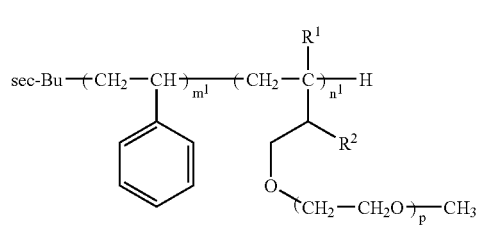

(2)

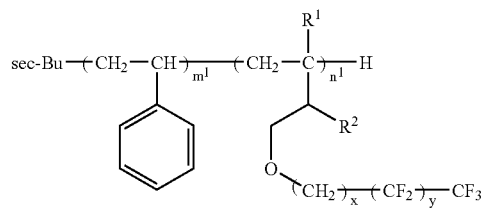

(3)

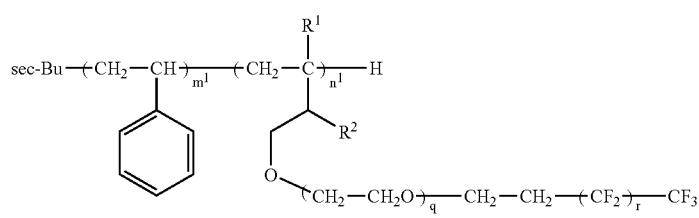

(4)

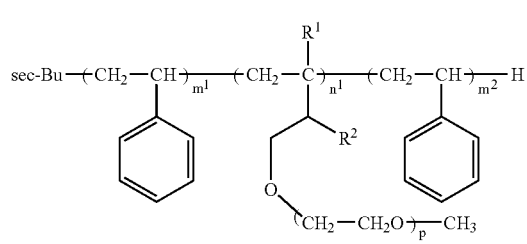

(5)

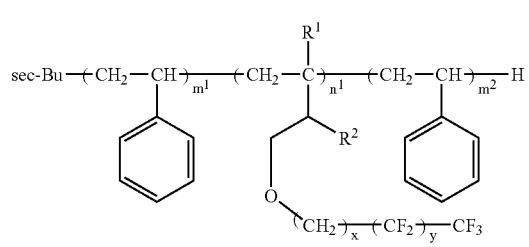

-continued

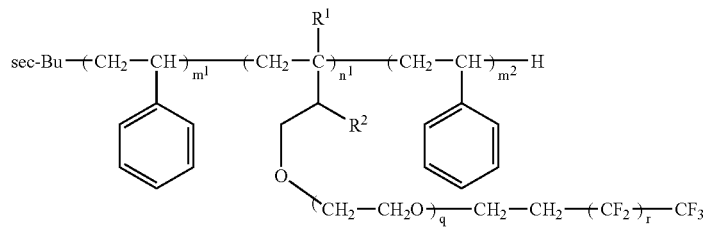

(6)

Other specific embodiments of the invention include the following compounds (7)-(9), wherein any variables are as defined for compounds of formula (III). Again, any suitable and effective initiator can be employed, giving rise to other groups in place of sec-butyl. Likewise, quenching agents other than methanol may be employed, giving rise to terminal groups other than hydrogen.

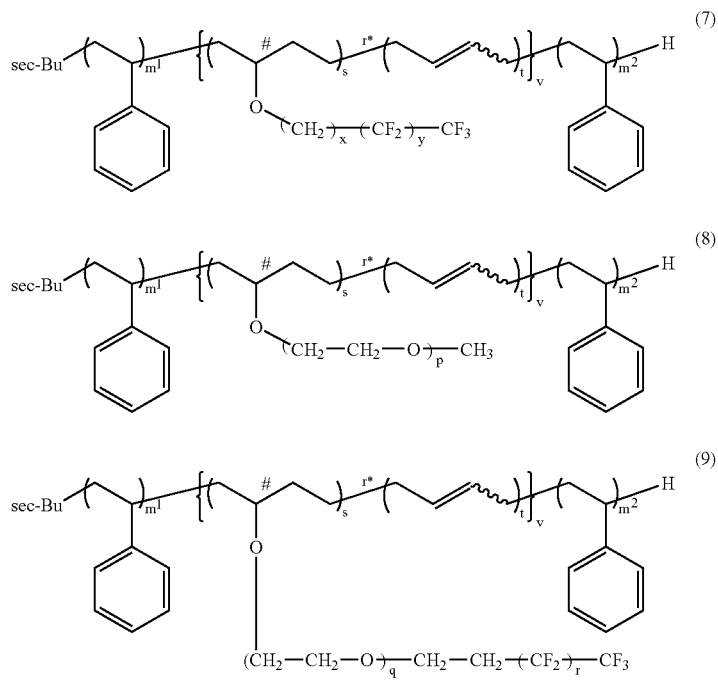

Exemplar Methods of Making the Compounds of the Invention.

Processes for preparing the compounds and surface-active block copolymers of the invention are provided as further embodiments of the invention. The compounds and compositions can be prepared by any of the applicable techniques of organic synthesis. Many such techniques are well known in the art. However, many of the known techniques are elaborated in *Compendium of Organic Synthetic Methods* (John Wiley & Sons, New York), Vol. 1, Ian T. Harrison and Shuyen Harrison, 1971; Vol. 2, Ian T. Harrison and Shuyen Harrison, 1974; Vol. 3, Louis S. Hegedus and Leroy Wade, 1977; Vol. 4, Leroy G. Wade, Jr., 1980; Vol. 5, Leroy G. Wade, Jr., 1984; and Vol. 6, Michael B. Smith; as well as March, J., *Advanced Organic Chemistry*, 3$^{rd}$ Ed., (John Wiley & Sons, New York, 1985), *Comprehensive Organic Synthesis. Selectivity, Strategy & Efficiency in Modern Organic Chemistry*, in 9 Volumes, Barry M. Trost, Ed.-in-Chief (Pergamon Press, New York, 1993 printing).

Generally, the reaction conditions such as temperature, reaction time, solvents, work-up procedures, and the like, will be those common in the art for the particular reaction to be performed. The cited reference material, together with material cited therein, contains detailed descriptions of such conditions. Typically the temperatures will be about −100° C. to about 200° C., solvents will be aprotic or protic depending on the conditions required, and reaction times will be about 1 minute to about 10 days. Work-up of standard organic transformation reactions typically consists of quenching any unreacted reagents followed by partition between a water/organic layer system (extraction) and separation of the layer containing the product. Work-up of reactions with polymers typically consists of concentrating the reaction mixture by removing a quantity of solvent, followed by precipitation of the polymer using a solvent or solvent system in which the polymer has low or substantially no solubility, such as, for example, methanol, or a combination of water and methanol.

Oxidation and reduction reactions are typically carried out at temperatures near room temperature (about 20° C.), although for metal hydride reductions frequently the temperature is reduced to 0° C. to −100° C. Oxidation and reduction reactions can also be heated when appropriate. Solvents are typically aprotic for reductions and may be either protic or aprotic for oxidations. Reaction times are adjusted to achieve desired conversions.

A. Preparation of Polymer Backbones

Processes for preparing polymer backbones of the invention are provided as further embodiments of the invention and are illustrated by the following procedures wherein the meanings of any generic variables are as given above. Surface-active block copolymers (SABCs) can be prepared by polymer analogous reactions on poly(styrene-b-isoprene) block copolymers (PS/PI). The PS/PI polymers can be synthesized by anionic polymerization in tetrahydrofuran (THF) at −78° C., using sec-butyllithium or n-butyllithium as the initiator, to provide polymers with pendent vinyl groups in the isoprene block mers.

Following a procedure described by Wang et al. (*Macromolecules*, 1997, 30, 1906), block copolymers of polystyrene and 1,2- or 3,4-polyisoprene can be synthesized. Similar block copolymers can be prepared as described by Youngblood et al. (*Biofouling*, 2003, 19 (Supplement), 91-98). Methods for preparing block copolymers of polystyrene and 1,2- or 3,4-polyisoprene are well known in the art (see, for example, Ober et al., U.S. Pat. No. 6,750,296). Analogous block copolymers of polystyrene and polybutadiene can be prepared by similar techniques. A number of exemplary methods for the preparation of the compositions of the invention are provided below. These methods are intended to illustrate the nature of such preparations are not intended to limit the scope of applicable methods.

When the polymer backbone (e.g., polystyrene-block-polydiene (diblock or triblock)) is prepared under conditions that result in mainly pendant vinyl groups (e.g., 1,2- or 3,4-polymerization of isoprene), some 1,4 polymerization may occur. When the polystyrene-b-poly(isoprene) is prepared in THF at −78° C., the extent of 1,4-addition is about 3-7% (See Lee & Han, *Macromolecules*, 2002, 35(3), 760).

Typically, the polystyrene block will be at least 6,500 g/mol weight-average molecular weight. Accordingly, the polystyrene blocks of formula (I), (II), and (III) typically have values of $m^1$ and $m^2$ of at least 60 to about 65, however smaller values can occur randomly or by employing techniques known to limit the length of polystyrene blocks. Polystyrene blocks that have values of $m^1$ and $m^2$ of formula (I), (II), and (III) of about 1600, about 1700, or about 2000 can also be prepared. For example, the preparation of polystyrene blocks with a weight-average molecular weight of about 176,000 g/mol (corresponding to an m1 value of about 1690) were described by Wang et al. *Macromolecules*, 1997, 30(7), 1906-1914.

In some embodiments of the invention, longer polystyrene blocks are employed. In some embodiments, such as when a semifluorinated side-chain is present, longer polystyrene blocks may be desirable. Heavily fluorinated polymers can have poor solubility in some solvents. Longer polystyrene blocks can impart greater solubility to a polymer in such instances. In some embodiments, the $m^1$ and $m^2$ values of formula (I), (II), and (III) can be larger than 100. In other embodiments, the $m^1$ and $m^2$ values of formula (I), (II), and (III) are larger than 200, larger than 250, larger than 300, larger than 500, larger than 750, or larger than 1000.

B. Side-Chain Attachment Techniques

Block copolymers can have reactive vinyl groups within the polymer backbone or on pendant side-chains. The vinyl groups can be converted to other functional groups to facilitate attachment of side chain groups, or to modify the properties of the polymer. Typically, the vinyl groups are converted to hydroxyl groups, halo groups, or epoxides. Vinyl groups can be converted to hydroxyl groups by several techniques well known to those of skill in the art. One method of converting vinyl groups to hydroxyl groups is by hydroboration chemistry using, for example, 9-borabicyclo[3.3.1]nonane (9-BBN), followed by oxidation, for example, using sodium hydroxide and hydrogen peroxide. The hydroxyl groups on the polymer can be used to create ether linkages to any side chain that imparts suitable and advantageous properties to the polymer produced, such as antifouling properties. Examples of such side chains include semifluorinated alcohols, perfluoroalkyl alcohols, poly(ethylene glycol) and oligo (ethylene glycol) derivatives, and ethoxylated fluoroalkyl alcohols such as, for example, Zonyl surfactants. Semifluorinated side chains may be preferable over perfluorinated side chains because alkyl spacers in the partially fluorinated (semifluorinated) side chains result in better orientation of the fluorinated helices, and a well-packed fluorinated surface. Such a surface will not undergo molecular reconstruction upon immersion in a polar environment (Krishnan et al., *The Chemical Record* 2004, 4(5), 315).

The ether linkages from the backbone to the side-chains can be created by a variety of methods well known to those of skill in the art. Such methods include etherification chemistry (e.g, Williamson ether synthesis reactions), nucleophilic displacement reactions (such as an alkoxide displacement of a halogen), and epoxide opening reactions (such as nucleophilic epoxide ring-opening by alkoxides). The products of these reactions thus provide certain embodiments of the surface-active block copolymers of the invention.

Method 1: Hydroboration/Oxidation of Vinyl Groups. One technique to link side-chains to the polymer backbone involves the oxidation of vinyl groups to produce alcohol groups, and bromination of alcohol groups followed by ether formation reactions with a hydroxyl-containing side-chain group. Alternatively, the ether synthesis can be performed directly with the hydroxyl groups and a side-chain containing a sufficiently electrophilic group, such as a bromo or iodo group. Any suitable and effective oxidation technique can be employed to convert the vinyl groups into hydroxyl groups. Many different techniques are know for the oxidation of vinyl groups to hydroxyl groups (see for example, M. Hudlicky, "Oxidations in Organic Chemistry" A.C.S. Monograph No. 186, American Chemical Society, Washington, D.C. 1990).

Method 2: Bromination of Vinyl Groups. Another technique to link side-chains to the polymer backbone involves the bromination or iodination of vinyl groups followed ether formation, such as by a standard Williamson ether synthesis reaction.

Ether formation reactions do not always convert all halo groups (e.g., bromo or iodo groups) to ether groups. In some embodiments, about 50-90% of halo groups are converted to ether groups. In other embodiments, about 70% of hydroxyl groups are converted to ether groups. Optionally, all or some unreacted bromine groups on the polymer backbone can be removed by employing various reducing agents, such as, but not limited to, metal hydrides, including lithium aluminum hydride (LiAlH$_4$, or LAH), sodium borohydride (NaBH4), and sodium cyanoborohydride (NaBH$_3$CN). Depending on the reaction conditions and on the reducing reagent employed, some elimination may occur, resulting in the formation of new vinyl groups. These products can be subjected to further reactions to convert remaining vinyl groups to other functional groups, including the side-chains described herein.

Method 3: Epoxidation of Vinyl Groups. Another technique to link side-chains to the polymer backbone involves the epoxidation of vinyl groups, followed by epoxide ring-opening with a nucleophilic side-chain, such as a semifluorinated alcohol, PEG, or a Zonyl surfactant when treated with an appropriate base. Many olefin epoxidation and epoxide opening techniques are well known by those of skill in the art. Accordingly, any suitable and effective epoxidation and epoxide opening technique can be employed. By employing this technique, elimination reactions to form vinyl groups are minimal or completely absent.

C. Side-Chain Groups

The vinyl groups of a polymer backbone can be chemically modified in order to create ether linkages to various side chains. Such side-chain groups will impart suitable and advantageous properties to the polymer produced, such as antifouling properties. The vinyl groups can be converted to hydroxyl groups or halo groups (such as bromo or iodo groups). These groups can be used to link the polymer to side chains, such as perfluoro alcohols, e.g. $CF_3(CF_2)_7(CH_2)_6OH$, poly(ethylene glycol) (PEG) derivatives, e.g. oligo(ethylene glycol)s such as $CH_3(OCH_2CH_2)_{12}OH$, or ethoxylated fluoroalkyl alcohols, e.g. Zonyl surfactants such as $CF_3(CF_2)_4(CH_2CH_2O)_5CH_2CH_2OH$.

For certain embodiments, for example, certain polymers with PEG-derived side-chains, the value of $m^1$ and $m^2$ of formula (I), (II), and (III) will be higher than in other embodiments. Some polymers with PEG-derived side-chains can potentially be soluble in water. A partially water-soluble antifouling coating would be undesirable because it could leach into bodies of water when used as a marine coating. Larger sized polystyrene blocks can reduce the water sensitivity of a coating. Accordingly, certain embodiments employ larger value of $m^1$ and $m^2$ of formula (I), (II), and (III), such that water solubility is reduced. As such, certain embodiments with PEG-derived side-chains will have polystyrene blocks that have $m^1$ and $m^2$ values of formula (I), (II), or (III) of about 200 to about 2000, about 500 to about 1800, about 600 to about 1200, or about 1000.

The magnitude of any preferred value of $m^1$ and $m^2$ will often depend on the nature of the side-chain of the embodiment, and also on the magnitude of the polydiene-derived block. In some embodiments, when the values of $m^1$ and $m^2$ increase above 100, the value of the $n^1$ block also typically increases. Similar increases, or alternatively, decreases, are often substantially proportional to the percent change in the value of $m^1$ or $m^2$, for example, from about 100 or about 200. The substantially proportional changes can be in ratios (of $m^1$ to $n^1$) of about 1:1, about 1:0.8, about 1:0.5, about 1:0.1, about 1:0.05, about 1:1.1, about 1:1.2, about 1:1.4; about 1:1.5, about 1:1.8; about 1:2, about 1:2.5, about 1:3, about 1:5, about 1:10, about 1:5, etc., and other greater or smaller ratios that impart advantageous properties to the resulting polymer.

In some polymers used for coatings that have large polystyrene blocks, a significant portion of the surface is composed of polystyrene, which can result in lower than desirable surface energy because of the preference of the thermodynamically preferred block to occur on the surface. Accordingly, certain embodiments of the invention can have polystyrene blocks that have $m^1$ values that are about 0.5 to about 1.5 times the value of the $n^1$ block. In other embodiments, $m^1$ values that are less than the value of the $n^1$ block, or less than about 0.5 times the value of the $n^1$ block may be suitable. For example, certain embodiments with Zonyl surfactant-derived side-chains can be used for coatings when the polystyrene blocks are less than about 200 repeating units, less than about 100 repeating units, less than about 70 repeating units and in the absence of polystyrene.

D. Coating Compositions

Block copolymers with semifluorinated side-chain groups are typically soluble in aromatic solvents, such as, for example, toluene (b.p. 111° C.), α,α,α-trifluorotoluene (b.p. 105° C.), various oxygenated solvents such as acetone (b.p. 47° C.), EPA-exempt halogenated solvents such as dichloromethane (b.p. 40° C.), and combinations thereof. The level of halogenated solvents (including CFCs) used in any dissolving process can be kept as low, in order to avoid contributions to upper-atmosphere pollution. The content of the higher boiling aromatic solvents can also be optimized so that coatings dry at a suitable rate under ambient conditions.

The coatings of the invention can be prepared by casting solutions or emulsions of a TPE and a SABC on a substrate. Any suitable and effective solvent or dispersion system can be employed. Examples of suitable solvents include toluene, α,α,α-trifluorotoluene, and combinations thereof. A film of the SABC can be cast on a film of a SEBS elastomer using one of several methods, and the bilayer can be annealed at a temperature above the glass transition temperature of the PS block (about 100° C.).

PEG-derived block copolymers can be applied as waterborne coatings with suitable co-solvents. Alternatively, Cellosolve (alkoxy-ethanol)-based coatings can be prepared, for example, using ethyleneglycol monobutyl ether as a solvent. Certain embodiments of the invention, including the surface-active block copolymers prepared from epoxidized polymers, have additional advantages besides simplicity and economy. One such advantage is that residual epoxy and hydroxyl groups on the polymer backbone can be used to crosslink the polymer to other compounds after a coating is applied. Such coatings are expected to be resistant to water-attack in the marine environment.

Thermoplastic SEBS can aid in anchoring a coating to a substrate. A base layer of SEBS will contain domains of micellized polystyrene blocks of the TPE in the ethylene/butylenes copolymer matrix. Thermal annealing of the bilayer coating can anchor the SABC to the SEBS layer by interpenetration of the PS block of the SABC chains into the PS domains of the SEBS. This improves adhesion of the SABC layer to the SEBS and prevents leaching of the coating into the sea-water. Using this approach, only a small quantity of the surface active polymer is required for the desired coating performance.

Typically, the coating composition is applied over a surface, such as, for example, a surface that contains thermoplastic polymer. Such surfaces may be, or may form a coating on, for example, a boat hull or any other surface in need of a coating that has antifouling properties. Thus, the coating compositions can be used in conjunction with other coatings, such as, for example, a thermoplastic coating, or a coating of any other suitable elastomer.

These coatings can form a base layer upon which the SABC is positioned. Typically, the base layer will include a thermoplastic polymer, such as one that includes a polystyrene block in conjunction with another polymer. Other thermoplastic polymers include polyolefins, such as, for example, polypropylene, polyethylene and the like; ethylene-vinyl acetate copolymers, polyamides, polycarbonates, polystyrenes, polyethylene terephthalates, polyesters, poly(meth)acrylates, and copolymers and mixtures thereof. The coating compounds of the invention can include additives, such as stabilizers, pigments, fillers, plasticizers, dispersants, water or solvents to form coating compositions. The coating composition can be a solution or an emulsion. The coatings can be applied by any suitable an effective method, such as by spray-coating a solution. The coatings can also be applied by as an emulsion, such as one wherein the polymer is dispersed in water.

The compounds of the invention can be used as protective coatings for surfaces in need of antifouling properties. The coatings can form single layer coatings, bi-layer coatings, or multi-layer coatings. The preparation of bi-layer coatings using side-chain modified SABCs has been described by Ober et al., U.S. Pat. No. 6,750,296.

In certain embodiments of the invention, the coating can be formed by spray-coating. When a spray-coating technique is used, compounds of formula (I), (II), and (III) that have $m^1$, $m^2$, and $n^1$ values of less than about 500 or less than about 250 may be preferred. Specifically, the values of $m^1$, $m^2$, and $n^1$ can be about 50-150, about 60-100, or about 65. Such smaller values of $m^1$, $m^2$, and $n^1$ can result in microscopically smoother coatings when employing a spray-coating technique. Microscale roughness has been found to affect release of marine algae such as *Ulva* and *Navicula* that are typically about 5-10 µm in size. Such marine algae are often found to adhere to boat hulls and other marine surfaces.

When used to form bilayer coatings, some embodiments will contain polymers wherein the average-weight molecular weight (AWMW) of the polystyrene block of the surface-active block copolymer (top layer) is within about 40% of the average-weight molecular weight of the polystyrene block of the base layer, for example, a SEBS base layer. In other embodiments, the AWMW of the polystyrene block of the surface-active block copolymer (top layer) is within about 30%, about 20%, about 10%, or about 5% of the AWMW of the polystyrene block of the base layer.

In some embodiments of the invention, the polymer used to produce the coating in a diblock polymer. In other embodiments, the polymer is a triblock polymer. In triblock polymer embodiments, the values of $m^1$ and $m^2$ are typically with about 20% of each other. Specifically, the values of $m^1$ and $m^2$ can be within about 10% or within about 5% of each other.

In one embodiment, a triblock polymer is used wherein the values of $m^1$ and $m^2$ are about 65 and the value of $n^1$ is about 600. Other embodiments can be prepared wherein each value is proportionately increase or decreased as described above. For example, embodiments can be prepared wherein the values of $m^1$ (and $m^2$) have increased by about 5 (about 2%) and the values of $n^1$ have increase by about 50 (or about 10%). These values of $m^1$, $m^2$, and $n^1$ can be readily measured by one skilled in the art. For example, gel permeation chromatography can be used to measure the molecular weights of polymers. Such chromatography typically has a resolution of about 500 g/mol. Accordingly, polystyrene blocks (monomers with a molecular weight of about 104 g/mol) can readily measured in increments of about 5. Additionally, $^1$H-NMR spectroscopy can be used to determine the relative number of styrene- and diene-derived mers of block copolymers.

Surface Characterization

The surface energy of the coatings was quantified by determining the dynamic (advancing and receding) contact angles of water drops on these surfaces. To determine the extent of surface reconstruction upon prolonged exposure to sea water, the contact angle of an air bubble adhering to the substrate submerged in water was measured using the captive air bubble method. The surface morphology and chemical composition of the coatings was characterized using Atomic Force Microscopy (AFM), and Near-Edge X-Ray Absorption Fine Structure (NEXAFS).

The semifluorinated (SF) side groups in the SABC self-assemble to form liquid crystalline domains on the surface. Furthermore, if the order-to-disorder transition temperature of the liquid crystalline arrangement is above ambient temperature, restructuring of the surface upon exposure to water can be avoided. The polymers of the invention have been designed to take advantage of this feature. NEXAFS is a surface spectroscopy technique that was used to probe the chemical composition within the top few nanometers of the surface.

NEXAFS was also used to determine the orientation of molecules at the surface. These experiments involve the X-ray excitation of a carbon K shell electron to unoccupied low-lying antibonding σ* or π* molecular orbitals. Because sharp core level excitations for C and F occur in the soft X-ray region, NEXAFS is an effective technique for probing molecular orientations of the SF side groups in the SF polymers. The surface compositions were also analyzed using X-ray photoelectron spectroscopy.

AFM was used to probe the morphology of the SABC/SEBS surface, as these are expected to greatly influence the fouling release properties of the surface. Tapping mode AFM techniques were employed, using different amplitudes of the cantilever oscillation. At very low amplitudes ("light tapping") the three-dimensional topography of the surface was imaged. At higher amplitudes, ("hard tapping") hard structures beneath soft surfaces become discernable.

EXAMPLES SECTION

A number of exemplary methods for the preparation of compounds of the invention are provided herein, for example, in the Examples hereinbelow. These methods are intended to illustrate the nature of such preparations are not intended to limit the scope of applicable methods. Certain compounds of the invention can be used as intermediates for the preparation of other compounds of the invention.

The invention can be illustrated by the following non-limiting examples.

Example 1

Coatings Based on Side-chain Ether-linked PEG and FC Polymers

MATERIALS AND METHODS: Tetrahydrofuran (THF) was distilled from a sodium/benzophenone complex under nitrogen. Elastomeric styrene-ethylene/butylene-styrene (SEBS) G1562M was donated by Kraton Polymers (Houston, Tex.). All other reagents purchased from Aldrich Chemical Company (Milwaukee, Wis.) and were used without further purification unless otherwise mentioned.

Synthesis of Block Copolymer Polymer (PS/PI(25/15)) and Hydroxylated Block Copolymer (PS/PI(25/15)-OH)

These polymers were prepared via anionic polymerization followed by polymer analogous modification. Poly(styrene-b-isoprene) (PS/PI(25/15)) polymers with poly(styrene) molecular weight ($M_n$) of 25,000 g/mol and poly(isoprene) molecular weight of 15,000 g/mol and 1,2- and 2,3-polyisoprene content greater than 97% were synthesized (polydispersity of 1.05) and subjected to hydroboration-oxidation reaction to yield the corresponding hydroxylated diblock copolymers with an extent of conversion of approximately 99% (Table I) (PS/PI(25/15)-OH), similar to results as reported by Mao et al. (Macromolecules, 1997, 30, 2556). Details of the experimental conditions for the polymer modification procedure are given below. Table 1 gives the degree of side chain modification for the prepared materials as well as intermediate step modification amounts (PS-b-PI-OH and PS-b-PI-Br).

TABLE 1

Side-group Attachment Reactions

| Sample | % Side-group Modification[a] |
|---|---|
| PS-b-PI—OH | >99 |
| PS-b-PI—Br | >99 |
| PS/PI(25/15)OH—O-PEG164 | 65 |
| PS/PI(25/15)OH—O-PEG550 | 60 |
| PS/PI(25/15)Br—O—H6F8 | 70 |

[a] As determined by $^1$H-NMR.

Bromination of Poly(ethylene glycol), Semifluorinated Sidechains, and PS/PI(25/15)-OH (PEG164-Br, PEG550-Br, and PS/PI-Br)

Brominations were carried out on the monomethoxy poly (ethylene glycols) of molecular weights 164 (PEG164-OH) and 550 (PEG550-OH) similarly. Three mmol PEG-OH (PEG164-OH or PEG550-OH) and 3.5 mmol carbon tetrabromide dissolved in 2 mL methylene chloride (CH$_2$Cl$_2$) was chilled to –20° C. A solution of 4.0 mmol triphenylphosphine dissolved in 2 mL CH$_2$Cl$_2$ was added dropwise while stirring. The solvent was evaporated and the solid was extracted with water. After drying and filtering, clear viscous yellow oils were produced (PEG164-Br and PEG550-Br).

Bromination of polymer was similar, viz. 0.5 g PS/PI(25/15)-OH (3.0 mmol hydroxyl) and 3.5 mmol of carbon tetrabromide were dissolved in 5 mL of THF chilled to –20° C. Four mmol triphenylphosphine in 2 mL THF were added dropwise. The solution was filtered, precipitated and filtered once each into methanol and hexanes. A pale yellow rubbery polymer was recovered (PS/PI-Br) and was found to be brominated to over 99% (Table I).

Synthesis of Semifluorinated Alkyl Bromide Side-chains

A similar process can be used to brominate semifluorinated alcohols. Semifluorinated 1-bromoalkanes were synthesized following the procedure of Wang and Ober (Wang, J.; Ober, C. K. *Liquid Crystals* 1999, 26 (5), 637-648). Three grams (5.77 mmol) of ω-6-perfluorooctyl-hexanol and 3 g (9.05 mmol) of CBr$_4$ were dissolved in a mixture of 6 mL anhydrous THF and 12 mL anhydrous methylene chloride, and cooled to –5° C. Triphenylphosphine (2.37 g, 9.05 mmol) was then added in small portions over a period of about 15 minutes. After stirring for 1 hour at –5° C. and 6 hours at room temperature, solvent was evaporated from the reaction mixture under vacuum, and about 50 mL diethyl ether was added. The insoluble solid (triphenylphosphine oxide) was separated by filtration, and the filtrate was concentrated to obtain the crude product, which was purified by passing through a short silica gel column with diethyl ether as the elution solvent.

Attachment of the Polyethylene Glycol Side Groups to Block Copolymer (PS/PI(25/15)OH—OPEG164 and PS/PI(25/15) OH—O-PEG550)

In a typical polymer side-chain modification reaction, 0.15 g (0.88 mmol hydroxyl groups) of the hydroxylated block copolymer (PS/PI-OH) was dissolved in 2 mL anhydrous THF and either 0.3 mL PEG164-Br or 1.0 mL PEG550-Br. Seventy mg sodium hydride was added and the reaction was left stirring for 48 hours. The solution was precipitated into water and after filtering was precipitated again into methanol. The recovered polymers were a pale yellow elastic material with side-chain attachment between 55% and 70%.

A similar process can be used to attach SF side-chains to hydroxylated polymers. In such instances, N-methylpyrrolidine (NMP) can be used as a solvent and the reaction can be heated to elevated temperatures in order to decrease the reaction time.

Semifluorinated Block Copolymers (PS/PI(25/15)Br—O—H6F8)

The semifluorinated side-chain polymer was prepared with a phase transfer reaction where 1.0 g of the semifluorinated alcohol, 6-perfluorooctyl-1-hexanol (F8H6-OH), was refluxed in 1.0 g KOH and 2 mL of water for 1 hour. Two hundred mg PS/PI-Br and 20 mg of 18-crown-6 were dissolved in CH$_2$Cl$_2$ and added to the cooled basic dispersion, which was refluxed for 72 hours. The biphasic material was diluted with water and the CH$_2$Cl$_2$ evaporated away. The precipitated polymer was washed, recovered, and re-precipitated from THF into methanol. The resultant polymer was a pale yellow waxy solid. Details of the semifluorinated alcohol synthesis are similar to those reported by Wang et al. (*Macromolecules* 1997, 30, 1906).

Characterization of the Surface-active Block Copolymers $^1$H-NMR spectra were recorded on a Varian Gemini 400 MHz spectrometer. Infrared spectra were obtained using a Mattson on a 2020 Galaxy Series FTIR spectrometer. Contact angle values were determined using the captive air bubble technique as described by Andrade et al. (*J. Polymer Sci: Polymer Symp.* 1979, 66, 313) in a custom-built sample holder, distilled water, Gilmont syringe, and Ramé-Hart telescopic goniometer. Samples were soaked in distilled water for 1 hour prior to measurement of contact angles. An average of at least ten different individual measurements was used. The NEXAFS experiments were performed using the Dow/NIST U7A beamline at the Brookhaven National Laboratory. Atomic Force Microscopy was performed at the University of California at Santa Barbara.

Coating Preparation

The protein studies were carried out on bilayer polymer films prepared by spin-coating 0.5 wt % toluene polymer solutions onto a bottom layer of SEBS (styrene-ethylene-butylene-styrene thermoplastic elastomer) and annealing under vacuum at 120° C. for 15 hours (top-coat thickness ~70 nm). The SEBS bottom layer was prepared by spin-coating a 2 wt-% toluene solution onto glass cover slips (diameter 14 mm) and dried under vacuum at 120° C. for 24 hours (SEBS thickness, 500 nm).

The attachment of marine algal zoospores was carried out on bilayer polymer films prepared by solvent casting 15 wt-% toluene SEBS polymer solutions onto glass microscope slides (76×25 mm) and annealing under vacuum at 120° C. for 15 hours (SEBS dry film thickness, 1 mm). The SABCs were spin-coated onto the SEBS primer with 0.3% polymer solutions in toluene and dried under vacuum at 120° C. for 15 hours (top-coat thickness ~50 nm).

Protein Adsorption Studies

Protein adsorption studies were performed to characterize the coatings. Protein binding studies were performed using Alexa-Fluor-488 fluorescently labeled collagen, fibronectin, bovine serum albumin and immunoglobulin G at stock concentrations of 1 mg/mL. The samples were incubated for 90 minutes with the proteins dissolved at dilutions of 1:50, 1:50, 1:5, and 1:100, respectively, in phosphate buffered saline (PBS; 10 mM sodium phosphate pH 7.4, 150 mM sodium chloride, 1 mM sodium EDTA) in a humidified environment at room temperature. The samples were washed three times with PBS. Uncoated cover slips were used as controls with the above procedure. Background fluorescence of the polymer coated coverslips was determined by running the experimental protocol using PBS buffer solution without protein. Binding was recorded using an epifluorescence microscope equipped with a CCD camera.

Algal Zoospore Attachment Assays

Fertile plants of *Ulva linza* were collected from Wembury Beach, England (50°18'N; 4°02' W). Zoospores were released and prepared for attachment experiments as described by Callow et al. (*J. Phycol.* 1997, 33, 938). Ten ml aliquots ($1.5 \times 10^6$ spore $ml^{-1}$) were pipetted into individual compartments of polystyrene culture dishes (Fisher), each containing a glass microscope slide. Six replicate dishes were incubated in the dark for 1 hour before the slides were washed by passing backward and forward 10 times through a beaker of seawater, in order to remove unattached spores. Three replicate slides from each treatment were fixed in 2% glutaraldehyde in seawater and processed as described by Callow et al. The remaining three replicates were placed in a flow apparatus (Schultz et al., *Biofouling* 2000, 15, 143) that had been modified by fitting a higher capacity pump as described by Finlay et al. (*Integr. Compar. Biol.* (formerly *Am. Zool.*) 2002, 42, 1116)). Slides were exposed to a fully-developed turbulent flow for 5 minutes at 55 Pa wall shear stress.

After fixing slides in 2% glutaraldehyde adhered spores were visualized by autofluorescence of chlorophyll and quantified by image analysis as described by Callow et al. (*Biofouling* 2002, 18, 237). Thirty counts were taken at 1 mm intervals along the middle of the long axis of each of the three replicate slides. Means (x=90) and 95% confidence limits were calculated and expressed as mean number of attached spores $mm^{-2}$. The mean number of spores remaining attached to the surface after exposure to turbulent flow was compared with the mean number before the slides were subjected to flow. Data are expressed as percentage removal; 95% confidence limits were calculated from arcsine transformed data.

Pseudobarnacle Adhesion

Bilayer coatings were prepared by coating aluminum panels with epoxy resin, and curing to a tack free finish. Epoxy was then re-applied and cured until tacky, when a solution of maleic anhydride containing SEBS (Kraton® FG1901X) in toluene, was sprayed on the surface, and dried. Prior to applying the final coat, a fresh layer of the regular SEBS (Kraton® G1562M), was applied by spray-coating from 12.5% toluene with a crafts-style air-brush using compressed nitrogen at 30 psi, and dried.

Figure 3:
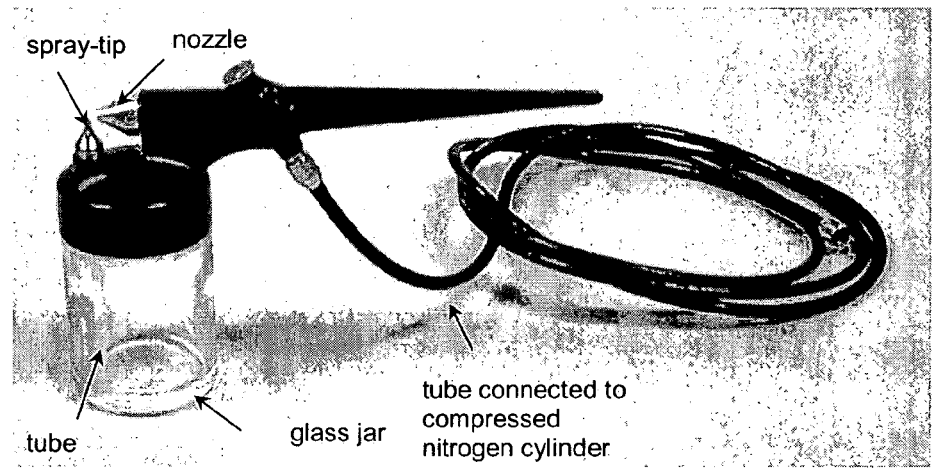
FIG. 3 illustrates a device for spray-coating (Badger Model 250, single-action, external-mix, siphon-feed airbrush).

FIG. 3 illustrates a device for spray-coating (Badger Model 250, single-action, external-mix, siphon-feed airbrush). The polymer solution is taken in the glass jar, and reaches the spray-tip by air suction. The solution is dispersed by a pressurized nitrogen-stream flowing through the nozzle upon pressing the button on the nozzle. The degree of atomization is controlled by the air pressure and the coating viscosity. The width of the spray can be adjusted (from ¾ in. to 2 in.) by raising or lowering the spray tip. Back and forth spraying was done such that the entire panel was wetted from a distance of approximately 6 inches and the edge of each pass overlapped with the previous pass. After air drying until no odor of toluene was evident, the panel was rotated by 90 degrees clockwise and sprayed as before.

After four coatings the panel, was dried overnight in air. The final top-coating of the surface-active block copolymer was spray coated to approximately 200 nm thickness from toluene (SF side-chains) or chloroform (PEG side-chains) and the panels were annealed in either vacuum at 120° C. in the case of SF side-chains, or under water for 1 hour in the case of PEG side-chains. Final SABC topcoat was applied in a similar method by weighing out a pre-determined amount of material into the well, diluting with an appropriate solvent, and coating as before until the ink well went dry. The SABC thickness was estimated from amount deposited (using only the weighed amount in the well), density, and area of the panel. This overall procedure ensured good adhesion to the test panels. Pseudobarnacles were attached to the surface with epoxy and pulled straight off with a force gauge with a limit of 20 pounds of force.

Adhesion of Bilayer Coatings to Substrates

Styrene-ethylene/butylene-styrene (SEBS) thermoplastic elastomers, such as Kraton G1652, show poor adhesion to glass or metal substrates. When SEBS-coated glass slides are placed in a water channel under a shear stress of about 55 Pa generated by the water flow, the coatings often delaminate from glass surfaces. However, the adhesion of the coatings to glass or metal substrates can be greatly improved by the use of SEBS grafted with maleic anhydride groups. Maleic anhydride grafted SEBS, such as Kraton FG1901x, can react with epoxy, hydroxyl or amine groups on the surface of metal or glass, preventing delamination of the coating. SEBS without the maleic anhydride groups can then be coated on top, followed by annealing of the two layers.

The following procedure was found to successfully bind the coatings to glass surfaces and prevent delamination of the coatings even after 2-week immersion in sea-water and high shear-stress values.

Glass microscope slides fully frosted on one side were immersed in a 3:1 mixture of concentrated sulfuric acid and 30% hydrogen peroxide for 30 minutes, rinsed with distilled water, and air dried. A 95% ethanol/5% water solution was adjusted to a pH of about 4.5 to 5.5 with acetic acid. (3-Glycidoxypropyl)trimethoxysilane (GPS) was added with stirring to yield a 2% final concentration. After about 5 minutes, the glass slides were dipped into the solution and gently agitated for about 2 minutes. They were then dipped briefly in ethanol to rinse excess materials, and cured at 110° C. for 1 hour.

Poly(glycidyl methacrylate) was prepared by free radical polymerization of 35 g of glycidyl methacrylate in 150 mL of methyl ethyl ketone using AIBN (0.3695 g, 2.25 mmol) as initiator at 60° C. Ten mL of this polymer solution was diluted with 20 mL of ethyl methyl ketone, and blended with a solution containing 5% w/v each of SEBS (Kraton G1652) and SEBS with grafted maleic anhydride (Kraton FG1901x) in toluene. The GPS functionalized glass slides were coated with the blend, air dried, and then coated again with a 10% w/v solution of SEBS. After drying at room temperature in a fume-hood, the slides were annealed in at 125° C. under vacuum for about 2 hours. SEBS was then compression molded on the glass slides to obtain about 1 mm thick films firmly bound to glass. The SABC solutions were then spray-coated on the SEBS substrates.

RESULTS

Synthesis

Anionic block copolymerization of styrene and isoprene followed by polymer analogous modification was used for the preparation of the block copolymers. The overall synthetic procedure for PEG-ylated and semifluorinated (SF) side-chain block copolymers is illustrated in Scheme 1.1. The block copolymer was hydroxylated, prior to attachment of PEG-ylated and semifluorinated side groups, by a hydroboration reaction of the side-chain double bonds with 9-BBN.

The attachment of the side groups was carried out by formation of ether functionalities from the hydroxyl groups of the block copolymer. In each modification step the extent of substitution of the isoprene side chains of the parent block copolymer was determined by 1H-NMR (see Table 1, above). FT-IR spectra were used to follow the modification reaction. As PS/PI was hydroxylated, there was an emergence of a peak at 3500 cm$^{-1}$ that was then attenuated by further reaction by PEG-ylation. The emergence of peaks at 2800 cm$^{-1}$ and 1100 cm$^{-1}$ was indicative of the PEG side chain. In the PS/PI-Br, complete attenuation of the hydroxyl peak occurred, while the semifluorinated polymer showed a strong fluorine signal at 1200 cm$^{-1}$. These results for the fluorinated polymer were confirmed by $^{19}$F-NMR.

One method of side-chain attachment involved combining a hydroxylated polymer with a bromine-containing side-chain in the presence of a base. Alternatively, the hydroxyl functionalities of the polymer could be converted to bromide groups. The ether linkage was then formed by combining the brominated polymer with a side-chain possessing a hydroxyl group in the presence of an appropriate base (see Scheme 1.1).

For attachment of PEG-derived side-chains, typically the side-chain was brominated and coupled with a hydroxylated polymer. For semifluorinated alkyl-derived side-chains, typically the side-chain was coupled with a brominated polymer, although either combination of side-chain and polymer reactions can be performed. The polymer shown if Scheme 1.1 is for illustrative purposes only. One skilled in the are understands that isoprene-derived units within the n-block can have 1,2-, 3,4-, or 1,4-linkages, and such units can occur randomly within the n-block. Additionally, the sec-butyl group and hydrogen at either end of the polymer could be switched with respect to each other each other.

Surface Studies—Contact Angle Measurements

Typical dynamic contact angle measurements showed a significant difference in the advancing and receding contact angles (hysteresis). The advancing contact angles of a captive air bubble are given in Table 2.

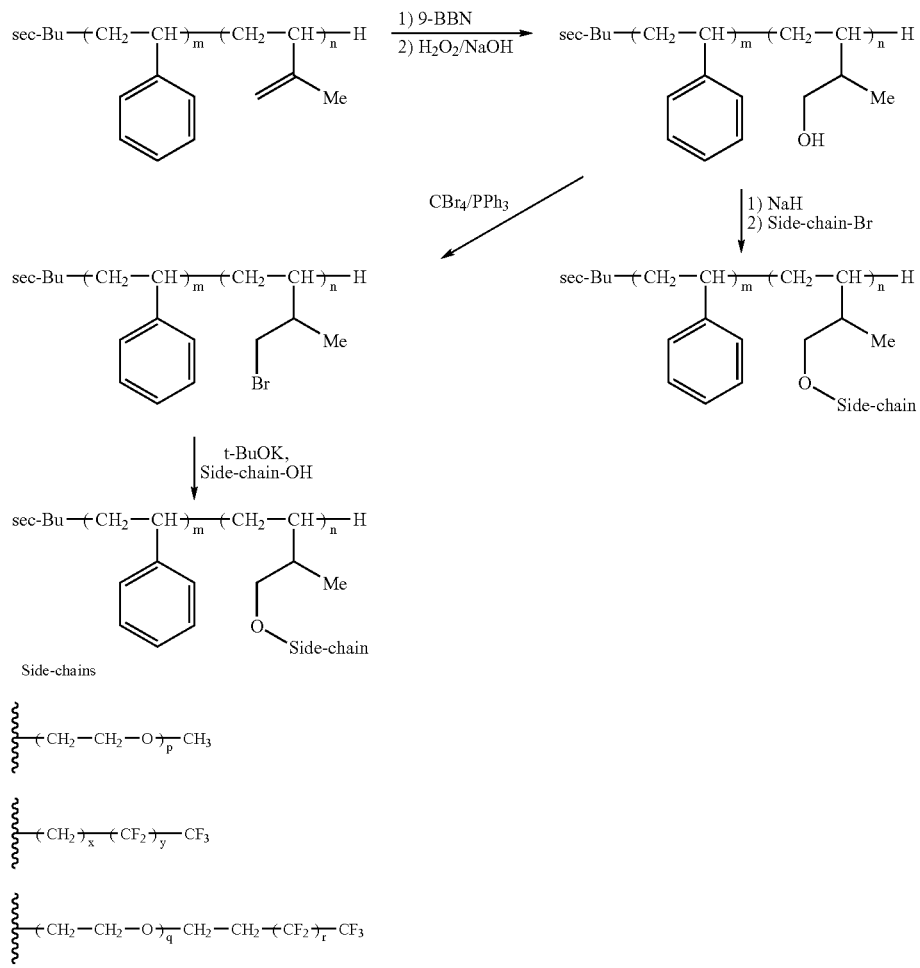

Scheme 1.1.
Preparation of the surface-active block copolymers (SABC).

TABLE 2

Under-water static contact angles of bilayer coatings

| Sample | θ (degrees)* |
|---|---|
| SEBS | 76 ± 4 |
| Polystyrene | 70 ± 2 |
| PS/PI(25/15)Br—H6F8 | 90 ± 4 |
| PS/PI(25/15)OH-PEG164 | 58 ± 3 |
| PS/PI(25/15)OH-PEG550 | 74 ± 9 |

*Underwater contact angles were determined after 1 hour of immersion. Values shown are the mean and standard deviation from 10 replicate measurements.

The effect of the SABC on the surface is clearly evident. The SEBS primer had an advancing contact angle of 76°, while the SEBS surface modified with semifluorinated SABC [PS/PI(25/15)Br—H6F8] had an advancing contact angle of 90°, indicating an enhanced hydrophobic nature. However, upon modification with the PEG containing SABC, viz. PS/PI (25/15)OH-PEG164, the contact angle was lowered to 58°. PS/PI(25/15)OH-PEG550 coated SEBS bilayers had a value not significantly different to the SEBS base. For reference, polystyrene has been included in Table 2 and, predictably, has a value of ca. 70°, just below that of SEBS.

NEXAFS studies of the SABC with SF side groups show that only a small amount of PS is present at the surface, as indicated by the relatively low intensity of the 1 s→π* transition peak of the PS phenyl ring at 284.5 eV. The NEXAFS experiments were carried out at eight different orientations of the sample with respect to the incident X-ray beam, θ, (θ=20, 30, 40, 55, 60, 70, 80, and 90°).

Figure 4:
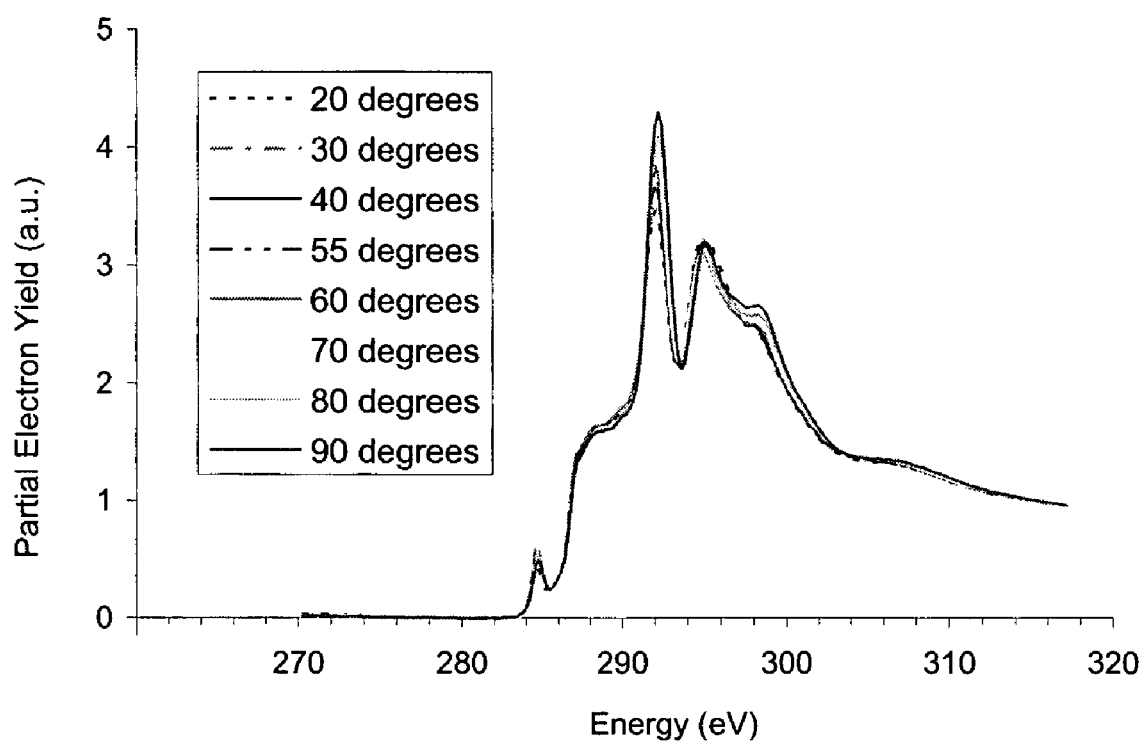
FIG. 4 illustrates representative angle dependent NEXAFS spectra of SABC with SF side groups.

FIG. 4 illustrates a representative angle dependent NEXAFS spectra of SABC with SF side groups. As can be seen from FIG. 4, the intensity of the 1 s→σ* transition associated with the C—F bond (E=292.0 eV) showed an angular dependence, which indicates ordering of the SF side groups at the surface.

Figure 5:
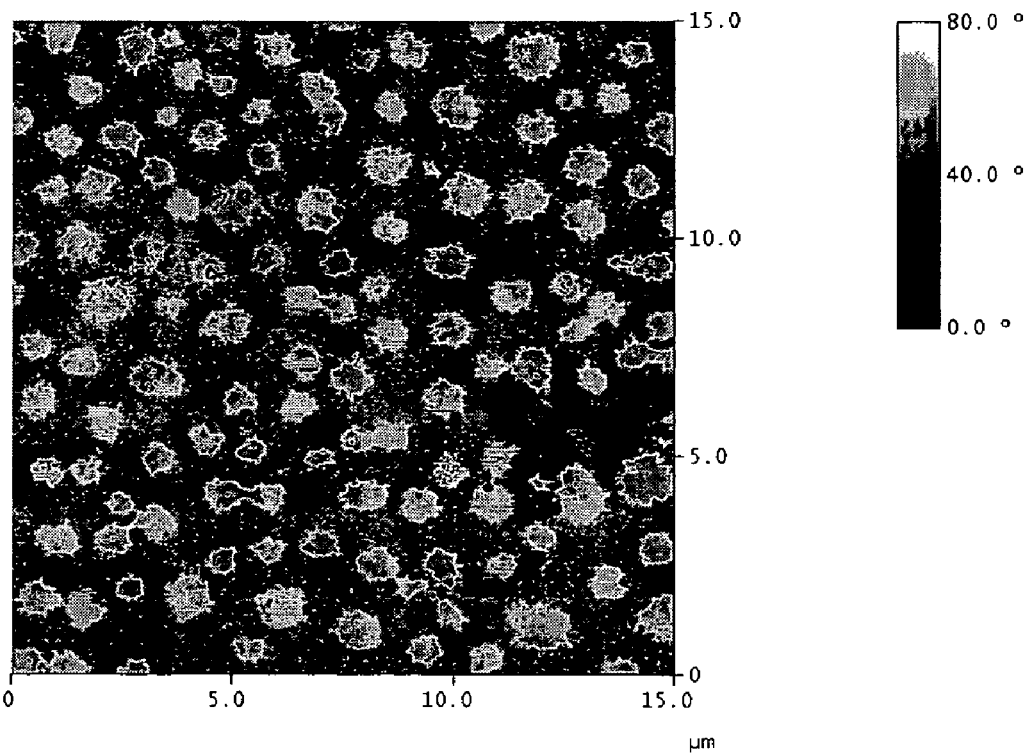
FIG. 5 illustrates a representative AFM phase-image of a coating containing SABC with SF side groups.

FIG. 5 shows a representative AFM phase-image of a coating containing SABC with SF side groups. The SABC forms domains on the surface, and the lower SEBS layer is exposed in some regions where SABC domains are not present.

Zoospore Attachment and Release

Figure 6:
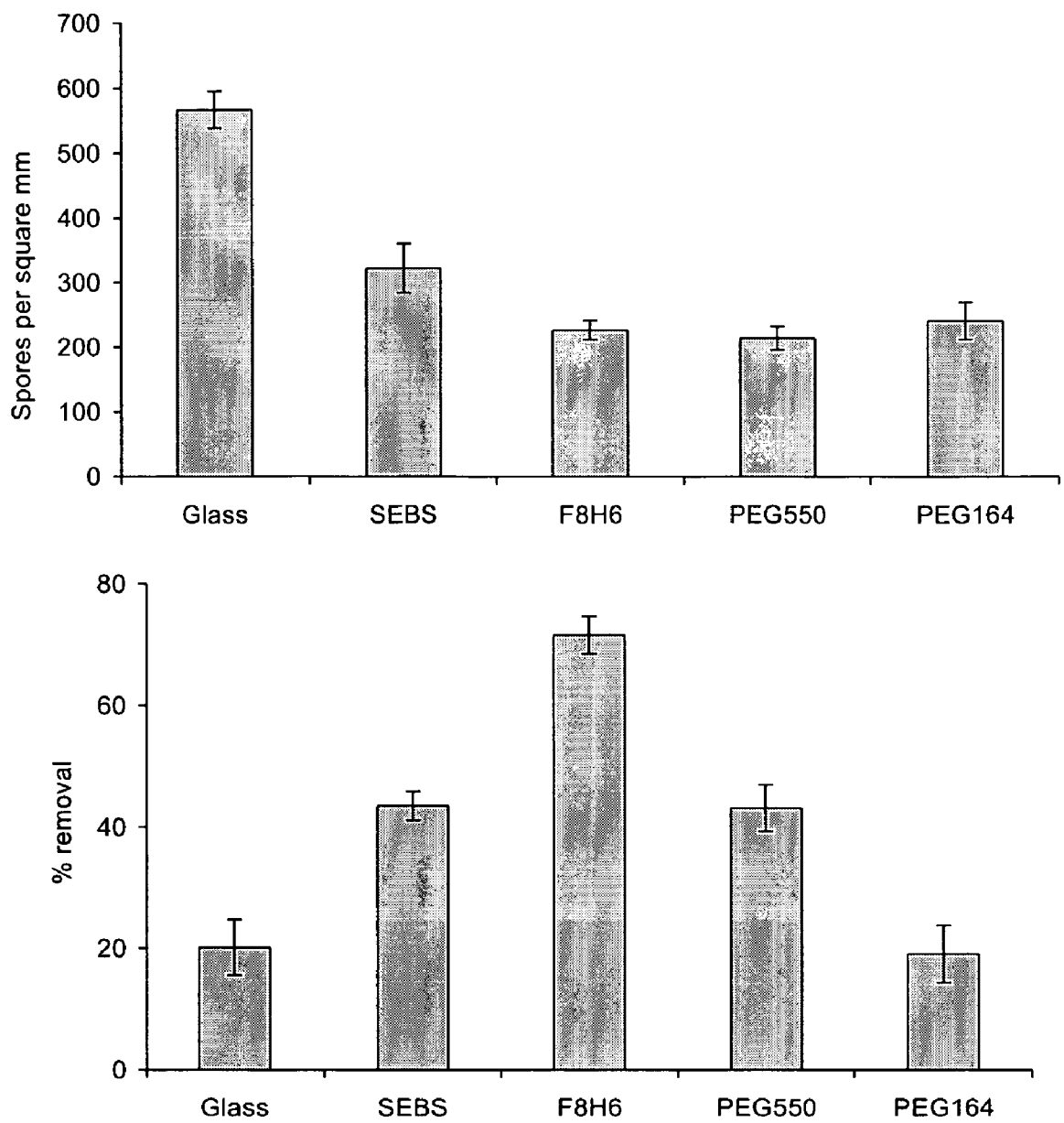
FIG. 6 illustrates *Ulva* zoospore settlement (top), and release after applying 55 Pa shear stress of turbulent water stream (bottom), from the coatings. All polymers were prepared starting from PS/PI block copolymers with block molecular-weights of 25,000 g/mol and 15,000 g/mol, respectively. F8H6, PEG550 and PEG164 represent the surface-active block copolymers PS/PI Br—F8H6, PS/PI OH-PEG550 and PS/PIOH-PEG164, respectively.

The number of spores that settled on glass was about two times higher than the settlement on the other surfaces. FIG. 6 shows the *Ulva* zoospore settlement (top), and release after applying 55 Pa shear stress of turbulent water stream (bottom), from the coatings. All polymers were prepared starting from PS/PI block copolymers with block molecular-weights of 25,000 g/mol and 15,000 g/mol, respectively. F8H6, PEG550 and PEG164 represent the surface-active block copolymers PS/PI Br—F8H6, PS/PI OH-PEG550 and PS/PIOH-PEG164, respectively.

One-way ANOVA showed that the settlement on glass and the SEBS base were significantly different from each other and also from all the other coatings. There were significant differences in the adhesion strength of settled zoospores on the four surfaces. The greatest release was from the fluorinated PS/PI(25/15)Br—H6F8 coating. Approximately 70% of the spores were removed from this coating compared to only about 20% and 40%, respectively, from glass and the SEBS surfaces. One-way ANOVA on arcsine-transformed data revealed no difference between glass and PS/PI(25/15) OH-PEG164, and between the SEBS base and PS/PI(25/15) OH-PEG550 ($p<0.05$).

Figure 7:
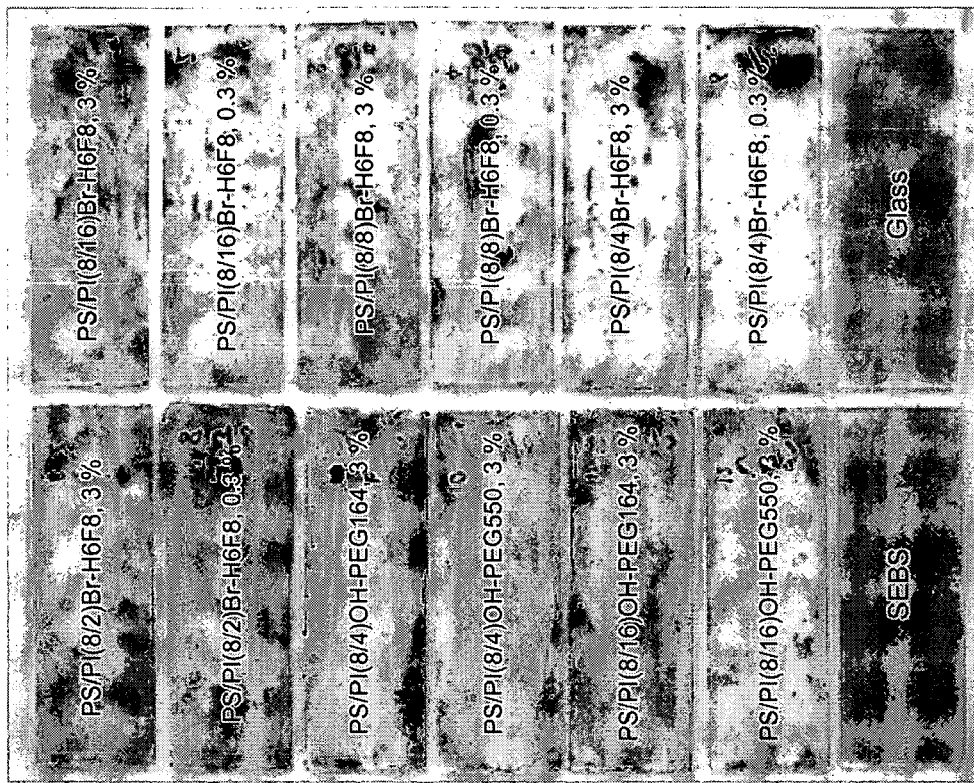
FIG. 7 illustrates the results of sporeling removal assays on glass microscope slides coated with the SF and PEG containing SABCs of different molecular weights. 3% and 0.3% indicate the weight concentrations of the solutions of SABC used for spin-coating.

Sporeling settlement (the study of the more fully developed *Ulva* spores) was also used to assess biofouling. FIG. 7 shows the appearance of glass microscope slides covered with the bilayer coatings (SF and PEG containing SABCs) prepared using SABCs of different molecular weights, after the sporeling removal assays. The 3% and 0.3% labels indicate the weight concentrations of the solutions of SABC used for spin-coating (FIG. 7). It is clear that the removal of sporelings upon exposure to a turbulent shear stress of 55 Pa, is better on the surfaces coated with the SABC, when compared to glass or SEBS surfaces. Thus materials have been prepared that have utility in enhancing biofouling organism removal.

Pseudobarnacle Adhesion

Figure 8:
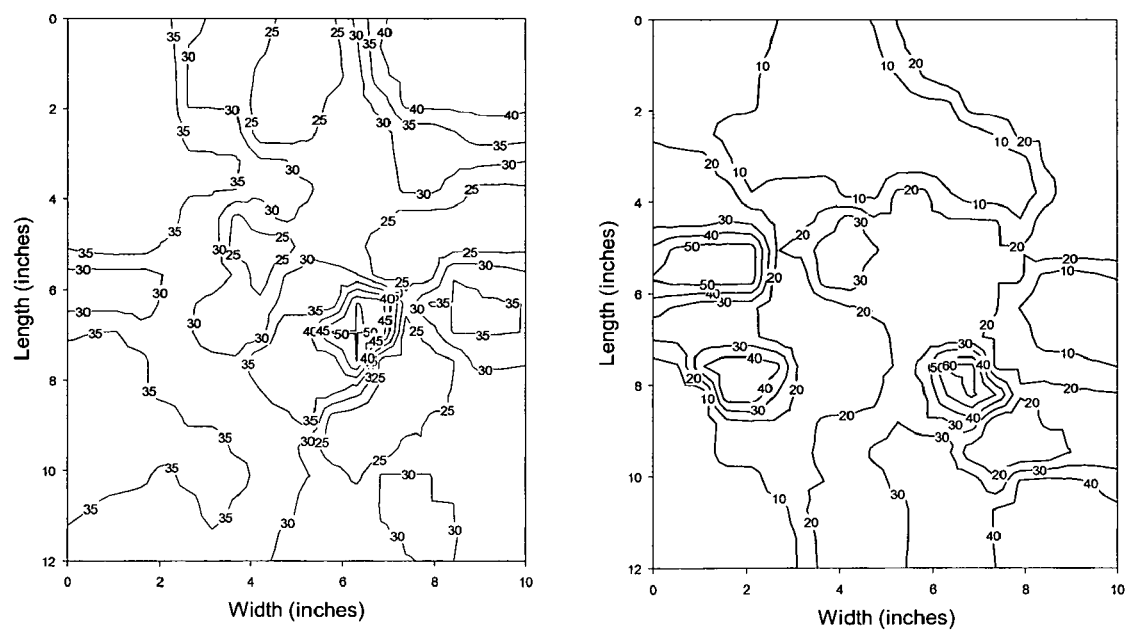
FIG. 8 illustrates Contour plots of pull-off pressure (psi) of pseudobarnacles on semi-fluorinated bilayer coatings (prepared starting from PS/PI block copolymer with 25,000 g/mol and 15,000 g/mol PS and PI blocks).

Bilayer coatings prepared using an SEBS substrate and a semi-fluorinated SABC showed a significantly lower pseudobamacle pull-off force of about 7 lbs, compared to an uncoated SEBS substrate, which required about 20 lbs of force. However, the panels were not uniform in release behavior, with significant deviation in the pull-off force in different regions of the panel, as shown in FIG. 8. FIG. 8 illustrates the contour plots of pull-off pressure (psi) of pseudobarnacles on semi-fluorinated bilayer coatings (prepared starting from PS/PI block copolymer with 25,000 g/mol and 15,000 g/mol PS and PI blocks). The side chains were derivatives of F $(CF_2)_8(CH_2)_6OH$. The PEG-containing SABCs showed higher pull-off forces compared to the fluorinated coatings.

Figure 9:
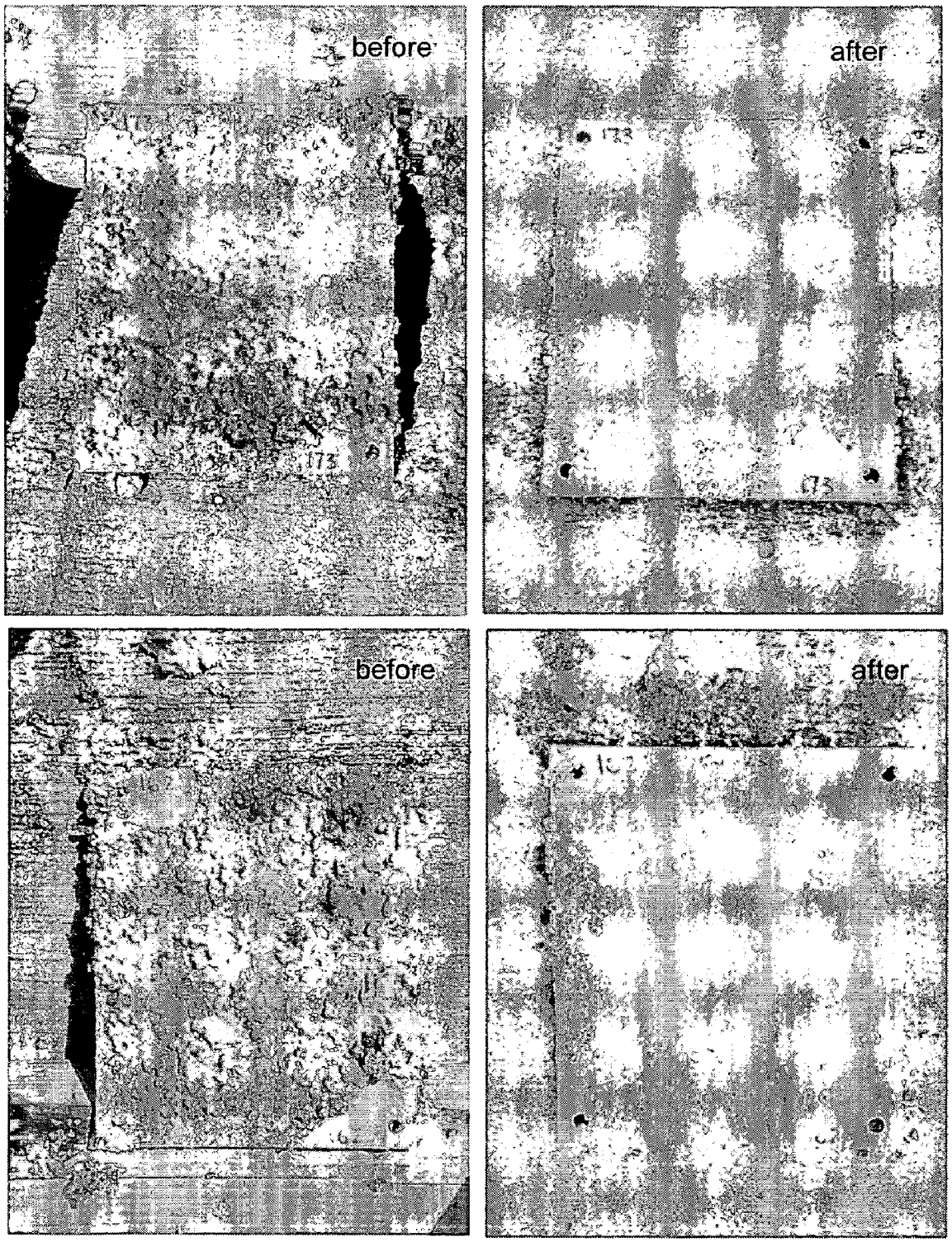
FIG. 9 illustrates plaques covered by PEG containing SABC: PS/PI(25/15)-PEG164 (top), and PS/PI(8/4)-PEG550 (bottom).

FIG. 9 shows the appearance of the test surfaces covered with the PEG containing SABC (plaques covered by PEG containing SABC: PS/PI(25/15)-PEG164 (top), and PS/PI(8/ 4)-PEG550 (bottom)). These surfaces are representative of the surfaces examined herein. While the samples were subject to hard fouling, regions of the panels showed positive performance. Those polymers with longer PEG brushes appeared to have better performance. Surfaces coated with semifluorinated groups showed similar positive behavior.

Discussion

Semifluorinated and PEG containing block copolymers were synthesized. These materials were coated via a newly developed spray coating process onto SEBS-coated aluminum panels for pseudo-barnacle adhesion testing. Results from the first batch of panels indicated that SF polymers have better adhesion reduction properties than the PEG materials (in the dry state). Due to heterogeneous surface morphology of the coatings and concerns about the molecular-weight incompatibility of the styrene blocks in the SABC and SEBS, new panels were prepared with lower molecular-weight polystyrene blocks in the SABC. However, the new panels showed inferior performance to the first batch. Various modifications of the process can lead to more uniform coatings that can provide for further improved fouling release.

Large plaques were coated with surface-active block copolymers on SEBS thermoplastic elastomer base layers. Samples required the development of new larger scale polymer syntheses of semifluorinated and PEG-modified SABCs to enable large scale coating. A new spray coating method was also developed to enable the deposition of these new coatings. Analysis of the plaques included pseudobarnacle testing and ocean immersion studies. In addition, the films were reproduced on a smaller scale for testing with *Ulva* zoospores. Surface analysis including NEXAFS studies, AFM and contact angle measurements all were used to characterize the perfection of the SABC surface for correlation with marine testing.

Most literature reports on contact angle measurements are concerned with water drop (static or dynamic) contact angle. While this is an important measurement for many experiments, it may be of less use in systems that are immersed in water for extended periods. Since marine organisms interact with wet surfaces, the captive bubble technique is a more relevant measure of the surface energy in the context of marine fouling. Captive bubble contact angle values are more akin to receding contact angles of water drops, than they are to advancing angles. Thus, it is consistent that the 90° captive bubble contact angle of the fluorinated surface of PS/PI(25/15)Br—H6F8 surface is close to the 95° receding contact angle for water, typical of PTFE. While it is evident that PS/PI(25/15)OH-PEG550 is more hydrophobic than the PS/PI(25/15)OH-PEG164 surface, it would have been expected that the contact angles would be similar. Kinetics of hydration and reconstruction may play a significant role here.

The settlement of *Ulva* zoospores was lower on all test surfaces, compared to glass and the SEBS base. There was only a small influence of the type of copolymer attached to the SEBS base even though the modifications resulted in surfaces of very different wettability. This result contrasts with previous data on spore settlement on mixed alkane thiolate self-assembled monolayers where it was shown that spore settlement increased 3-fold for an increase in water contact angle from 60° to 90° (Callow et al., *Appl. Environ. Microbiol.* 2000, 66, 3249).

Measurements of adhesion strength of the settled zoospores, however, showed substantial differences between the copolymers, with a positive correlation between levels of removal of attached spores and low surface wettability. This is consistent with previous data on SAMs showing that zoospore adhesion strength was greatest on hydrophilic (OH-rich) surfaces and weakest on hydrophobic ($CH_3$-rich) surfaces (Finlay et al., *Integr. Compar. Biol.* (formerly *Am. Zool.*) 2002, 42, 1116)). It is also consistent with the generalized relationship between low adhesion strength and low surface free energy often observed for fouling organisms (Baier, In *Influence of the initial surface condition of materials on bioadhesion. Proc. 3rd Int. Congr. Marine Corrosion and Fouling*. Northwestern University Press, Evanston, Ill., pp 633-639,1973; Callow & Fletcher, *Int. Biodeterior. Biodegr.* 1994, 34, 333), a property which forms the basis for the efficacy of foul-release coatings based on silicone elastomers (e.g. Swain et al., *Biofouling* 1998, 12, 259; Kavanagh et al., *Biofouling* 2001, 17, 155; Stein et al., *Biofouling* 2003, 19(suppl.), S71-S82).

Surfaces characterized by contact angle measurements, and analogous bilayers on microscope slides were tested by both NEXAFS and AFM. NEXAFS results indicate good orientation of the SF side groups. Contact angle measurements and NEXAFS studies indicated that the desired surfaces had been produced. AFM studies of the SF surfaces indicate a coating consisting of fluorinated liquid crystalline domains. This was observed with both the bilayers and the blend films. For the coatings with PEG side group, contact angles are consistent with a high degree of PEG at the surface.

The uniformity of the surfaces depended on how the coatings were applied on the substrate. Previous studies have shown that the uniformity varies with processing conditions, viz. the solvent used for spin coating, the concentration of the SABC solution used for spin coating, etc. Any non-uniformity of the coated surface could also be the cause of the observed molecular-weight effects on fouling release, as rheological properties of the coating solution change with molecular-weight.

Initially, for the pseudobarnacle tests, panels coated with SABCs prepared from high molecular-weight PS/PI block copolymers (viz., 25,000 g/mol and 15,000 g/mol PS and PI blocks) were used. Results with the SF side group polymers showed promise and can be optimized to reduce the pull-off force. Lower molecular-weight SABC polymers were then prepared and tested. It should be noted that the PEG containing materials are expected to perform well only when immersed in water. The pseudobarnacle tests were performed in the dry state, thereby giving force gauge measurement at the maximum of 20 pounds.

CONCLUSION

Synthetic design and scale-up of surface-active block copolymers were successfully performed. A new spray coating method for SABC deposition was developed. Large test structures were prepared, and pseudobarnacle testing and marine evaluations were performed. A successful analysis of the issues associated with coating methods was completed. New improved coating preparation were developed. The results show that through proper molecular design of these bilayer coatings, a reduction in the pseudobarnacle adhesion force can be achieved. The semifluorinated bilayer coatings can be an economically feasible application of environmentally friendly marine fouling resistance/release coatings.

Example 2

Functionalization of Backbone Vinyl Groups

Anionic polymerization of styrene and isoprene in THF at −78° C. often results in about 3-7% 1,4-diene polymerization, wherein the isoprene double bond forms within the polymer backbone. Such a polymer can be represented as formula (IV) below (a specific example of a compound of formula (III)), wherein the units $n^1$, $n^2$, and $n^3$ occur randomly within the brackets. The 1,4-derived subunit is illustrated within the $n^3$ segment. Formula (IV) is for illustration only, and one skilled in the are would recognize that the methyl group of the 1,4-derived mer could be located at either the 2-position, as shown, or at the 3-position of the mer. Other variables are as defined by formula (II) above.

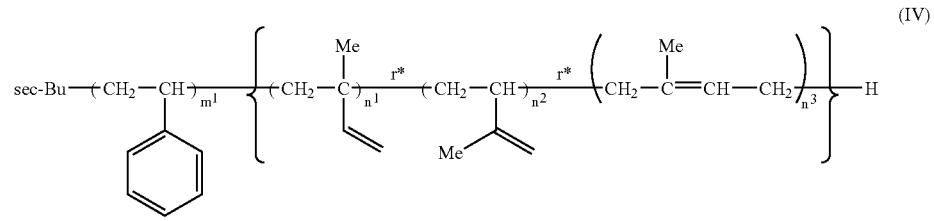

(IV)

Hydroboration/oxidation reactions can hydroxylate the vinyl group contained within the polymer backbone ($n^3$), as illustrated in Scheme 2.1 below. Bromination of the hydroxyl group produces the mers represented in structure (A). Etherification with a semifluorinated alcohol (or alternatively, a PEG-derived alcohol or Zonyl surfactant alcohol) results in side-chain functionalized polymer (B). However, elimination can also occur, resulting in structure (C). Elimination can occur in about 1-20% of the brominated 1,4-isoprene derived mers, and more typically occurs in about 1-10% of the mers.

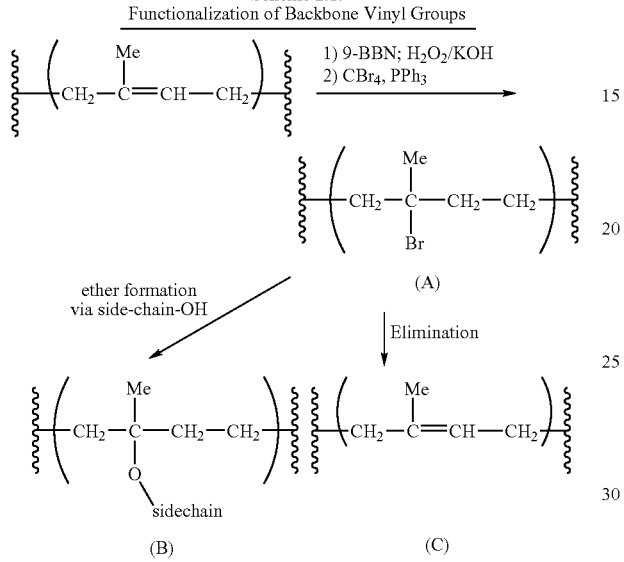

Accordingly, compounds of the invention can include any combination of groups (A), (B), and (C), and their derivatives, in the polyisoprene-derived blocks of compounds of formulae (I), (II), and (III). The subunits (A), (B), and (C) and their derivatives can be arranged in any order (i.e., their arrangement can be random) within any isoprene-derived block. Similar reactions can be performed on polymer backbones derived from butadiene, such as those with polybutadiene blocks. Accordingly, the compounds of the invention include such compounds prepared from polybutadiene-containing polymers. The invention also provides compositions that include the compounds of the invention, methods for preparing compounds of the invention, and methods of using the compositions that contain these compounds.

Example 3

Side-chain Ether-linked Styrene-Butadiene Block Copolymers

A novel synthetic approach to side-chain ether linked surface active block copolymers (SABC)s is provided herein (Scheme 3.1). Various polymers with vinyl groups within in the polymer backbone can be employed. The instant example employed a polystyrene-b-polybutadiene-b-polystyrene triblock polymer. A suitable triblock polymer is Kraton D-1102, 45,000 g/mol, 30 wt. % of which is the polystyrene block.

Bromination Process

Commercially available Kraton® block copolymers, polystyrene-polybutadiene-polystyrene (SBS), and polystyrene-polyisoprene-polystyrene (SIS), were brominated via liquid bromine in tetrahydrofuran solution (>98% conversion). Commercially available semifluorinated alcohols, such as 1H, 1H,2H,2H-perfluorododecanol and 1H,1H,2H,2H-perfluorodecanol, or methyl ether poly(ethylene glycol)s of various molecules weights were attached to the brominated block copolymers using catalytic lithium aluminum hydride in a tetrahydrofuran solution (typically 25-50% conversion).

After attachment, the reaction was charged with a large excess of lithium aluminum to remove the residual bromine groups. The ratio of side-chain units to olefins in the resulting polymer was approximately 3:7, due to competing elimination reactions. This novel procedure provides a simple and inexpensive approach to the SABCs in a large quantities, and the products exhibit similar properties to those reported by J. P. Youngblood et al. (*Biofouling* 2003, 19, 91).

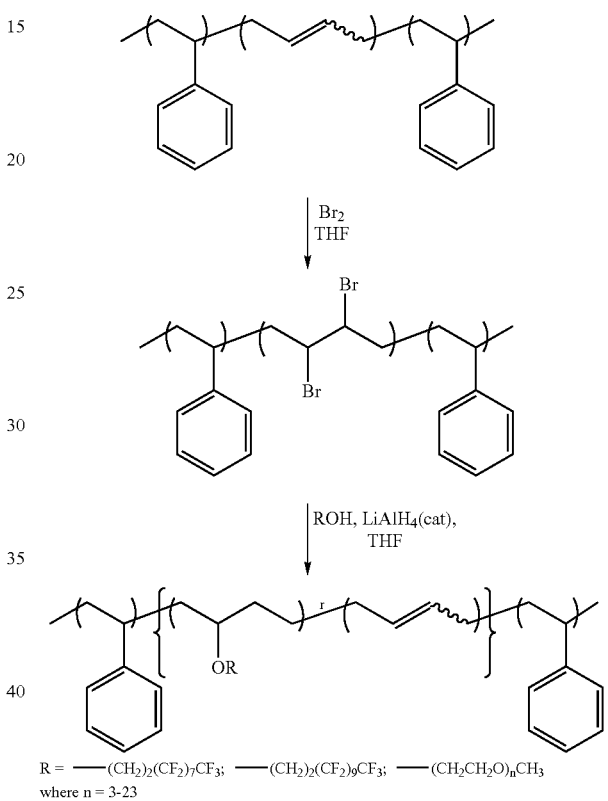

In Scheme 3. 1, the "r" placed between the moieties resulting from reaction with the butadiene monomer indicates that the distribution of the units to either side are randomly repeated in any order, as is well understood by one skilled in the art. The ratio of side-chain units to olefins in the resulting polymer was approximately 3:7, due to competing elimination reactions.

SBS (Kraton D1102, 10.0 g, 0.16 mol) was dissolved in 500 mL THF in a 1000 mL flask at room temperature. The SBS precursor had an overall molecular weight of about 45,000 g/mol and a styrene content of about 30%. Bromine (27 mL) was added via an addition funnel slowly over a period of 4 hours with stirring, and the reaction was maintained for 3 additional hours. The solution was slowly poured into a large excess of methanol to precipitate the polymer. The polymer was collected via filtration, and again dissolved in THF. The THF solution was re-precipitated into methanol to remove residual bromine. The white-colored product was dried in vacuum oven at 30° C. for 12 hours, and $^1$H NMR spectroscopy in deuterated chloroform indicated a conversion of nearly 100%.

The attachment of the brominated polymer to the side-chains was performed in anhydrous THF. The brominated SBS (10 g) and semifluorinated alcohol or PEG (20 g) were dissolved in anhydrous THF. Lithium aluminum hydride (1.0 M in THF, slight excess with respect to the molar ratio of the semifluorinated alcohol or PEG) was added to the solution. The solution was then refluxed for three days, and a large excess of lithium aluminum hydride solution (1.0 M) was then added to the solution. The solution was then refluxed for 24 hours. The solution was cooled to room temperature and slowly transferred into ethyl acetate to quench the residual lithium aluminum hydride. The solution was poured into 2.0 wt % hydrochloric acid solution to precipitate the product.

The precipitated product was dissolved in THF, and was then re-precipitated using methanol (twice) to remove any un-reacted side chain components. The product was dried in a vacuum oven at 40° C. for 12 hours. Elemental analysis and $^1$H NMR spectra indicated that the former diene block was substituted with side chains at about 30 mol %. Greater than 65 mol % of the former diene mers were olefins, and less than 5 mol % of the former diene monomer units contained bromine substituents.

Epoxidation Process

Commercially available triblock copolymers, such as, for example, polystyrene-polybutadiene-polystyrene (SBS) or polystyrene-polyisoprene-polystyrene (SIS) can be epoxidized by oxidants, such as 3-chloroperoxybenzoic acid (m-CPBA) or hydrogen peroxide. The side chains can be directly attached to the epoxidized polymer via nucleophilic addition of the alcohol to the epoxide group, as illustrated in Scheme 3.2. Residual epoxy groups can be opened by employing dilute hydrochloric acid in tetrahydrofuran.

Scheme 3.2.
Side-chain Attachment via Epoxidation of Backbone Vinyl Groups

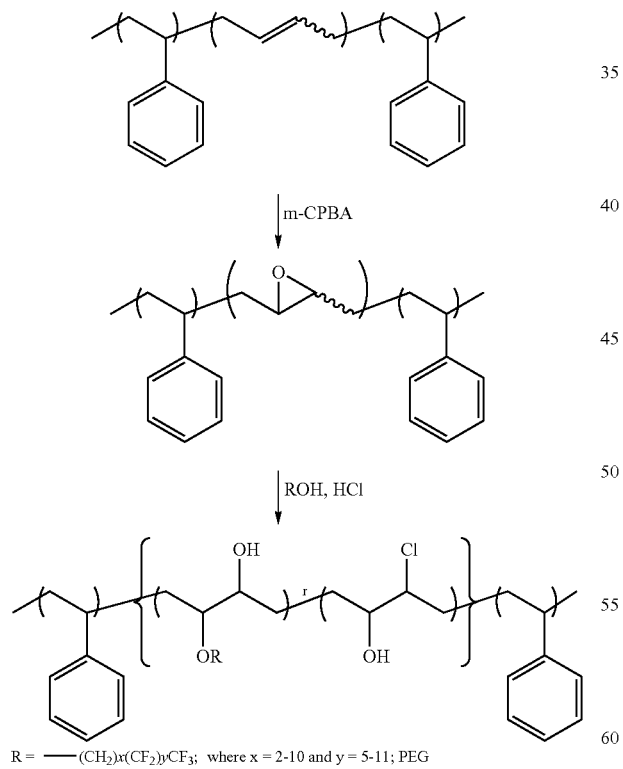

R = —(CH$_2$)$_x$(CF$_2$)$_y$CF$_3$; where x = 2-10 and y = 5-11; PEG

In Scheme 3.2, the "r" placed between the moieties resulting from reaction with the butadiene monomer indicates that the distribution of the units to either side are randomly repeated in any order, as is well understood by one skilled in the art.

A 500 mL flask was charged with SBS (10.0 g, 0.16 mol) and 200 mL chloroform at room temperature to form a homogeneous solution. m-CPBA (32.0 g, 0.19 mol) was added to the flask. The flask was sealed with a rubber septum, and the reaction was allowed to proceed for approximately 8 hours at room temperature. The epoxidized polymer was precipitated into 600 mL isopropanol and was filtered. The polymer was then rinsed repeatedly with 200 mL isopropanol, and then dissolved in solvents (such as THF, dioxane and NMP) and stored in solution. $^1$H NMR spectrum indicated nearly 100% conversion.

A typical attachment reaction for the PEG side chains is as follows. Twenty grams PEG methyl ether (550 g/mol) was added to 200 mL NMP solution containing 10.0 g epoxidized SBS. The solution was reacted at 130° C. for 48 hours. The solution was slowly poured into water, and precipitated polymer was recovered. The polymer was dissolved in 100 mL THF, and 10 mL hydrochloric acid was added. The solution was stirred for 4 hours, and was precipitated using saturated sodium carbonate solution. The polymer was dried at 50° C. in a vacuum oven for 12 hours. $^1$H NMR spectra indicated that the former diene monomer was substituted with PEG side chains at 30 mol % and opened epoxy groups at 70 mol %.

In summary, surface-active side groups were attached to polymer backbones via ether linkages. The chemistry of forming an ether linkage provided less than complete functionalization of the polyisoprene backbone. The residual bromine groups on the PI block have unknown effects on fouling release properties. Attachment of the side groups by an ester linkage can be achieved more easily, however, ester linkages are prone to hydrolysis upon prolonged exposure to water. Thus, antifouling coating with ether linked side chains present a more advantageous material for prolonged use.

All publications, patents, and patent documents are incorporated by reference herein, as though individually incorporated by reference. The invention has been described with reference to various specific and preferred embodiments and techniques. However, it should be understood that many variations and modifications may be made while remaining within the spirit and scope of the invention.

What is clamed is:

1. A compound of formula (II):

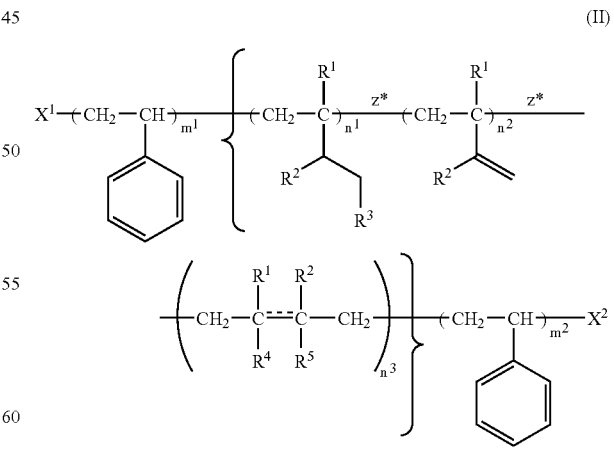

wherein $m^1$ is about 5 to about 2000;
$m^2$ is absent or is independently about 5 to about 2000;
$n^1$ is about 5 to about 2,000;
$n^2$ is 0 to about 100;
$n^3$ is 0 to about 100;

the dispersement of each individual $n^1$, $n^2$, and $n^3$ subunit on either side of either z* is random and each individual $n^1$, $n^2$, and $n^3$ subunit occurs interchangeably with any other $n^1$, $n^2$, or $n^3$ subunit within the brackets of formula (II);

$X^1$ is hydrogen, alkyl, or aryl;

$X^2$ is hydrogen, alkyl, or aryl;

wherein any alkyl or aryl can optionally be substituted with one or more halo, hydroxy, ($C_6$-$C_{10}$)aryl, nitro, cyano, ($C_1$-$C_8$)alkoxy, trifluoromethyl, poly(ethylene glycol), oxo, —C(=O)OR$^a$, —OC(=O) R$^a$, wherein each R$^a$ is independently hydrogen, ($C_1$-$C_6$)alkyl, or ($C_1$-$C_6$) alkoxy; or NR$^b$R$^c$, wherein R$^b$ and R$^c$ are each independently hydrogen, or ($C_1$-$C_6$)alkyl;

each $R^1$ is independently hydrogen or methyl and each $R^2$ is independently hyrogen or methyl provided that at least one of $R^1$ and $R^2$ within each n subunit is hydrogen;

each $R^3$ is independently H, OH, halo, or $$\text{—O}\text{—}(\text{CH}_2)_x\text{—}(\text{CF}_2)_y\text{—CF}_3, \quad (a)$$

wherein x is independently 2 to 10; and
y is independently 5 to 15;

$$\text{—O}\text{—}(\text{CH}_2\text{—CH}_2\text{—O})_p\text{—CH}_3, \quad (b)$$

wherein p is independently 2 to 24; or $$\text{—O}\text{—}(\text{CH}_2\text{—CH}_2\text{—O})_q\text{—CH}_2\text{—CH}_2\text{—}(\text{CF}_2)_r\text{—CF}_3, \quad (c)$$

wherein q is independently 0 to about 25; and
r is independently 1 to about 18;
provided that at least one $R^3$ is (a), (b), or (c);
each $R^4$ and $R^5$ are independently hydrogen, $R^3$, or are absent, provided that when $R^4$ is hydrogen, $R^5$ is $R^3$; and when $R^4$ is $R^3$, $R^5$ is hydrogen; and
the bond represented by - - - is absent or is present, provided that when the bond is present, $R^4$ and $R^5$ are absent.

2. The compound of claim 1 wherein the 1,2- and 3,4-polyisoprene-derived subunits comprise greater than 90% of the subunits of the polyisoprene-derived block.

3. The compound of claim 1 wherein each $R^1$ and $R^2$ are hydrogen.

4. A coating composition comprising a compound as described in claim 1 in combination with one or more of a polymer, water, or one or more solvents.

5. The compound of claim 1 wherein $m^1$ is 25 to 1000.

6. The compound of claim 1 wherein $m^2$ is absent or is 25 to 1000.

7. The compound of claim 1 wherein $n^1$ is 65 to 1,000.

8. The compound of claim 1 wherein the average-number molecular weight of a polystyrene block is 20,000 g/mol to 30,000 g/mol and the average-number molecular weight of the polyisoprene or polybutadiene block is 10,000 g/mol to 20,000 g/mol.

9. The compound of claim 1 wherein $X^1$ is ($C_1$-$C_6$)alkyl and $X^2$ is hydrogen.

10. The compound of claim 1 wherein 10-40% of all $R^1$ groups are methyl and 60-90% of all $R^2$ groups are hydrogen, and 60-90% of the all $R^1$ groups are hydrogen and 10-40% of all $R^2$ groups are methyl.

11. The compound of claim 1 wherein each $R^1$ and $R^2$ are hydrogen.

12. The compound of claim 1 wherein one or more $R^3$ is $$\text{—O}\text{—}(\text{CH}_2)_x\text{—}(\text{CF}_2)_y\text{—CF}_3.$$

13. The compound of claim 1 wherein one or more $R^3$ is $$\text{—O}\text{—}(\text{CH}_2\text{—CH}_2\text{—O})_p\text{—CH}_3.$$

14. The compound of claim 1 wherein one or more $R^3$ is $$\text{—O}\text{—}(\text{CH}_2\text{—CH}_2\text{—O})_q\text{—CH}_2\text{—CH}_2\text{—}(\text{CF}_2)_r\text{—CF}_3.$$

15. The compound of claim 1 wherein 5-50% of all $R^3$ groups are OH or Br.

16. The compound of claim 1 wherein each x is 3 to 9 and each y is 6 to 11.

17. The compound of claim 1 wherein each p is 2 to 16.

18. The compound of claim 1 wherein each q is 0 and each r is 1 to 18.

19. The compound of claim 1 wherein each q is 1 to 25 each r is 1 to 18.

20. The compound of claim 1 that is a compound of formula (I):

$$X^1\text{—}(\text{CH}_2\text{—CH(Ph)})_{m^1}\text{—}\{(\text{CH}_2\text{—C}(R^1)(CH(R^2)CH_2R^3))_{n^1}\text{—}^{z*}\text{—}(\text{CH}_2\text{—C}(R^1)(=CR^2))_{n^2}\}\text{—}(\text{CH}_2\text{—CH(Ph)})_{m^2}\text{—}X^2 \quad (I)$$

wherein $m^1$ is 5 to 2000;
$m^2$ is absent or is independently 5 to 2000;
$n^1$ is 5 to 2,000;
$n^2$ is 0 to 100;

the dispersement of each individual $n^1$ subunit and each individual $n^2$ subunit on either side of z* is random and each individual $n^1$ subunit and each individual $n^2$ subunit occurs interchangeably with any other $n^1$ or $n^2$ subunit within the brackets of formula (I);

$X^1$ is hydrogen, optionally substituted alkyl, or optionally substituted aryl;

$X^2$ is hydrogen, optionally substituted alkyl, or optionally substituted aryl;

wherein any alkyl or aryl can optionally be substituted with one or more halo, hydroxy, $(C_6$-$C_{10})$aryl, nitro, cyano, $(C_1$-$C_8)$alkoxy, trifluoromethyl, poly(ethylene glycol), oxo, —C(=O)OR$^a$, —OC(=O)R$^a$ wherein each R$^a$ is independently hydrogen, $(C_1$-$C_6)$alkyl, or $(C_1$-$C_6)$alkoxy; or NR$^b$R$^c$, wherein R$^b$ and R$^c$ are each independently hydrogen, or $(C_1$-$C_6)$alkyl;

each $R^1$ is independently hydrogen or methyl and each $R^2$ is independently hydrogen or methyl, provided that at least one of $R^1$ and $R^2$ within each $n^1$ or $n^2$ subunit is hydrogen;

each $R^3$ is independently H, OH, halo, or

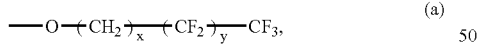  (a)

wherein x is independently 2 to 10; and
y is independently 5 to 15;

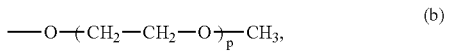  (b)

wherein p is independently 2 to 24; or

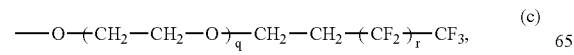  (c)

wherein q is independently 0 to 25; and
r is independently 1 to 18;
provided that at least one $R^3$ is (a), (b), or (c).

21. The compound of claim 1 that is a compound formula (III):

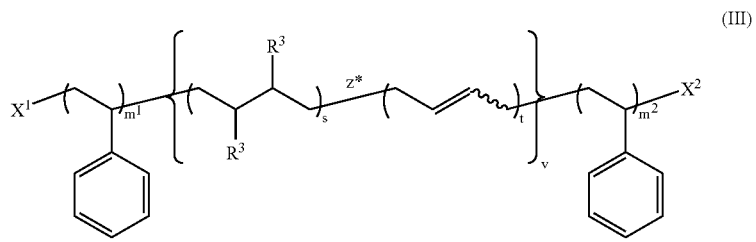

wherein $m^1$ is 5 to 2000;
$m^2$ is absent or is 5 to 2000;
s is 5 to 2000;
t is 5 to 500;
v is 1 to 100;
the dispersement of each individual s subunit and each individual t subunit on either side of z* is random and each individual s subunit and each individual t subunit occurs interchangeably with any other s or t subunit within the brackets of formula (III);

$X^1$ is hydrogen, alkyl, or aryl;
$X^2$ is hydrogen, alkyl, or aryl;

wherein any alkyl or aryl can optionally be substituted with one or more halo, hydroxy, $(C_6$-$C_{10})$aryl, nitro, cyano, $(C_1$-$C_8)$alkoxy, trifluoromethyl, poly(ethylene glycol), oxo, —C(=O)OR$^a$, —OC(=O)R$^a$, wherein each R$^a$ is independently hydrogen, $(C_1$-$C_6)$alkyl, or $(C_1$-$C_6)$alkoxy; or NR$^b$R$^c$, wherein R$^b$ and R$^c$ are each independently hydrogen, or $(C_1$-$C_6)$alkyl;

each $R^3$ is independently H, OH, halo, or

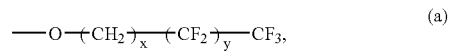  (a)

wherein x is independently 2 to 10; and
y is independently 5 to 15;

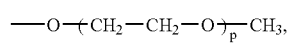  (b)

wherein p is independently 2 to 24; or

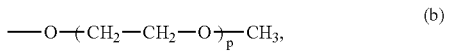  (c)

wherein q is independently 0 to 25;
r is independently 1 to 18, provided that when one $R^3$ of any given subunit s is (a), (b), or (c), the other $R^3$ of the same subunit s is not (a), (b), or (c); and
provided that at least one $R^3$ is (a), (b), or (c).

* * * * *

UNITED STATES PATENT AND TRADEMARK OFFICE
CERTIFICATE OF CORRECTION

PATENT NO. : 7,709,055 B2
APPLICATION NO. : 11/063242
DATED : May 4, 2010
INVENTOR(S) : Christopher K. Ober et al.

It is certified that error appears in the above-identified patent and that said Letters Patent is hereby corrected as shown below:

In column 34, line 63, in Claim 1, delete "about 5 to about 2000;" and insert -- 5 to 2000; --, therefor.

In column 34, line 64, in Claim 1, delete "about 5 to about 2000;" and insert -- 5 to 2000; --, therefor.

In column 34, line 65, in Claim 1, delete "about 5 to about 2,000;" and insert -- 5 to 2,000; --, therefor.

In column 34, line 66, in Claim 1, delete "0 to about 100;" and insert -- 0 to 100; --, therefor.

In column 34, line 67, in Claim 1, delete "0 to about 100;" and insert -- 0 to 100; --, therefor.

In column 35, line 16, in Claim 1, delete "hyrogen" and insert -- hydrogen --, therefor.

In column 35, line 42, in Claim 1, delete "about 25;" and insert -- 25; --, therefor.

In column 35, line 43, in Claim 1, delete "about 18;" and insert -- 18; --, therefor.

In column 35, line 54, in Claim 2, delete "-derived" and insert -- derived --, therefor.

Signed and Sealed this

Twenty-seventh Day of July, 2010

David J. Kappos
*Director of the United States Patent and Trademark Office*